(12) United States Patent
Adkinson et al.

(10) Patent No.: US 9,969,872 B2
(45) Date of Patent: May 15, 2018

(54) FILLED BUTYL RUBBER IONOMER COMPOUNDS

(71) Applicant: LANXESS, Inc., Sarnia (CA)

(72) Inventors: Dana K. Adkinson, London (CA); Jon Bielby, Wyoming (CA)

(73) Assignee: LANXESS Inc., Sarnia (CA)

( * ) Notice: Subject to any disclaimer, the term of this patent is extended or adjusted under 35 U.S.C. 154(b) by 60 days.

(21) Appl. No.: 14/917,625

(22) PCT Filed: Sep. 8, 2014

(86) PCT No.: PCT/CA2014/050847
§ 371 (c)(1),
(2) Date: Mar. 9, 2016

(87) PCT Pub. No.: WO2015/032000
PCT Pub. Date: Mar. 12, 2015

(65) Prior Publication Data
US 2016/0215131 A1 Jul. 28, 2016

(30) Foreign Application Priority Data

Sep. 9, 2013 (EP) .................................... 13183546
Jun. 27, 2014 (EP) .................................... 14174624

(51) Int. Cl.
*C08L 23/22* (2006.01)
*C08L 23/26* (2006.01)
*C08J 3/24* (2006.01)

(52) U.S. Cl.
CPC ............. *C08L 23/22* (2013.01); *C08J 3/246* (2013.01); *C08L 23/26* (2013.01); *C08J 2300/26* (2013.01); *C08J 2323/32* (2013.01); *C08L 2312/00* (2013.01)

(58) Field of Classification Search
CPC ...... C08L 23/22; C08L 23/26; C08L 2312/00; C08J 3/246; C08J 2300/26; C08J 2323/32
See application file for complete search history.

(56) References Cited

U.S. PATENT DOCUMENTS

| 5,665,183 | A * | 9/1997 | Kresge et al. | ........ B60C 1/0008 |
| | | | | 152/203 |
| 7,446,151 | B2 | 11/2008 | Resendes et al. | |
| 7,915,333 | B2 | 3/2011 | Resendes et al. | |
| 8,742,066 | B2 | 6/2014 | Adkinson et al. | |
| 8,946,319 | B2 | 2/2015 | Adkinson et al. | |
| 9,273,154 | B2 | 3/2016 | Kreuder et al. | |
| 9,388,258 | B2 | 7/2016 | Davidson et al. | |
| 2001/0007892 | A1* | 7/2001 | Minagawa et al. | ... C08L 19/006 |
| | | | | 525/197 |
| 2005/0245649 | A1 | 11/2005 | Parent et al. | |
| 2008/0207815 | A1* | 8/2008 | Resendes et al. | .... C08F 210/12 |
| | | | | 524/445 |
| 2008/0242771 | A1 | 10/2008 | Kulbaba et al. | |
| 2009/0182095 | A1 | 7/2009 | Resendes et al. | |
| 2011/0184087 | A1 | 7/2011 | Campomizzi et al. | |

OTHER PUBLICATIONS

Xie, Hong-Quan, et al., "Polymer blends with two kinds of elastomeric ionomers", Polymer, 1991, vol. 32, Butterworth-Heinemann Ltd., pp. 95-102.
Morton, Maurice et al., "Butyl and Halobutyl Rubbers", Rubber Technology, Third Edition, 1987, Van Nostrand Reinhold Company, Inc. pp. 297-300.
Parent, J. Scott, et al., "Ion-Dipole Inteaction Effects in Isobutylene-based Ammonium Bromide Ionomers", Journal of Polymer Science: Part A: Polymer Chemistry, vol. 43, 2005, Wiley Periodicals, Inc. pp. 5671-5679.
Parent, J. Scott, et al., "Isobutylene-based ionomer composites: siliceous filler reinforcement", Polymer 45, 2004, Elsevier Ltd., pp. 8091-8096.
Parent, J. Scott, et al., "Synthesis and Characterization of Iosbutylene-Based Ammonium and Phosphonium Bromide Ionomers", Macromolecules 2004, 37, American Chemical Society, pp. 7477-7483.
Encyclopedia of Polymer Science and Engineering, vol. 4, Composites, Fabrication to Die Design, Compounding, John Wiley & Sons, 1986, pp. 66-79.
Supplementary European Search Report from European Application No. 14843002, dated Jan. 31, 2017, three pages.
International Search Report from International Application No. PCT/CA2014/050847, dated Dec. 8, 2014, three pages.

* cited by examiner

*Primary Examiner* — Nathan M Nutter

(57) ABSTRACT

A cured blend of a butyl rubber ionomer, at least one elastomer co-curable with the butyl rubber ionomer and a filler has improved physical and/or dynamic properties, most notably improvements in one or more of green strength, flex fatigue, adhesion and tear strength.

20 Claims, No Drawings

FILLED BUTYL RUBBER IONOMER COMPOUNDS

FIELD

The present invention relates to polymers, especially elastomeric compounds comprising butyl rubber ionomer as an additive.

BACKGROUND

Poly(isobutylene-co-isoprene) or IIR, is a synthetic elastomer commonly known as butyl rubber (or Butyl polymer) which has been prepared since the 1940's through the random cationic copolymerization of isobutylene with small amounts of isoprene (usually not more than 2.5 mol %). As a result of its molecular structure, IIR possesses superior air impermeability, a high loss modulus, oxidative stability and extended fatigue resistance.

Halogenation of butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company© 1987), particularly pp. 297-300.

The development of halogenated butyl rubber (halobutyl) has greatly extended the usefulness of butyl by providing much higher curing rates and enabling co-vulcanization with general purpose rubbers such as natural rubber and styrene-butadiene rubber (SBR). Butyl rubber and halobutyl rubber are high value polymers, as their unique combination of properties (excellent impermeability, good flex, good weatherability, co-vulcanization with high unsaturation rubbers, in the case of halobutyl) make them preferred materials for various applications, such as their use in making tire inner tubes and tire inner liners.

The presence of allylic halide functionalities allows for nucleophilic alkylation reactions. It has been shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. Journal of Polymer Science, Part A: Polymer Chemistry 43, 5671-5679, 2005; Parent, J. S.; Liskova, A.; Resendes, R. Polymer 45, 8091-8096, 2004; Parent, J. S.; Penciu, A.; Guillen-Castellanos, S. A.; Liskova, A.; Whitney, R. A. Macromolecules 37, 7477-7483, 2004). The ionomer functionality is generated from the reaction of a nitrogen or phosphorus based nucleophile and the allylic halide sites in the halogenated butyl rubber to produce an ammonium or phosphonium ionic group respectively.

Like other rubbers, for most applications, butyl rubber must be compounded and vulcanized (chemically crosslinked) to yield useful, durable end use products. Grades of butyl rubber have been developed to meet specific processing and property needs, and a range of molecular weights, unsaturation, and cure rates. Both the end use attributes and the processing equipment are important in determining the right grade of butyl rubber to use in a specific application.

It would therefore be desirable to have butyl rubber ionomer compositions which exhibit better dynamic properties and physical properties.

SUMMARY

There is provided an elastomeric compound comprising a cured blend of a butyl rubber ionomer, at least one elastomer co-curable with the butyl rubber ionomer and a filler.

There is provided a process for producing an elastomeric compound comprising: blending a butyl rubber ionomer, at least one elastomer co-curable with the butyl rubber ionomer and a filler; and, curing the blend.

There is provided an article of manufacture comprising an elastomeric compound of the present invention.

The elastomeric compound has improved physical and/or dynamic properties results from blending the co-curable elastomer with the butyl rubber ionomer in a filled, cured compound. Most notably, improvements in one or more of green strength, flex fatigue, adhesion, traction, damping and tear strength may result. It has been surprisingly found that the inclusion of a butyl rubber ionomer as a partial replacement in a formulation with a co-curable elastomer results in compounds with beneficial physical and dynamic properties (e.g. crack growth resistance) without significantly sacrificing other properties.

Further features will be described or will become apparent in the course of the following detailed description.

DETAILED DESCRIPTION

The butyl rubber ionomer may be prepared from a halogenated butyl rubber polymer. The halogenated butyl rubber polymer may be prepared from a butyl rubber polymer. The butyl rubber polymer may be a copolymer derived from at least one isoolefin monomer and at least one multiolefin monomer and/or β-pinene, and optionally one or more further copolymerizable monomers.

Suitable isoolefin monomers include hydrocarbon monomers having 4 to 16 carbon atoms. In one embodiment, isoolefins have from 4-7 carbon atoms. Examples of suitable isoolefins include isobutene (isobutylene), 2-methyl-1-butene, 3-methyl-1-butene, 2-methyl-2-butene, 4-methyl-1-pentene, 4-methyl-1-pentene and mixtures thereof. A preferred isoolefin monomer is isobutene (isobutylene).

Multiolefin monomers copolymerizable with the isoolefin monomers may include dienes, for example conjugated dienes. Particular examples of multiolefin monomers include those having in the range of from 4-14 carbon atoms. Examples of suitable multiolefin monomers include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof. A particularly preferred conjugated diene is isoprene. β-pinene may also be used instead of or in addition to the multiolefin monomer. Herein multiolefin/β-pinene monomers refers to the presence or use of one or more multiolefin monomers and/or β-pinene monomer.

The butyl rubber polymer may optionally include one or more additional copolymerizable monomers along with the isoolefin and multiolefin/β-pinene monomers. Additional copolymerizable monomers include monomers copolymerizable with the isoolefin and/or multiolefin/β-pinene monomers. Suitable copolymerizable monomers include, for example, styrenic monomers, such as alkyl-substituted vinyl aromatic co-monomers, including but not limited to a $C_1$-$C_4$ alkyl substituted styrene. Specific examples of copolymerizable monomers include, for example, α-methyl styrene, p-methyl styrene, chlorostyrene, cyclopentadiene and methylcyclopentadiene. In one embodiment, the butyl rubber polymer may comprise random copolymers of isobutylene, isoprene and p-methyl stryene.

The butyl rubber polymers are formed from a mixture of monomers described herein. In one embodiment, the monomer mixture comprises from about 80% to about 99% by weight of an isoolefin monomer and from about 1% to 20% by weight of a multiolefin/β-pinene monomer. In another embodiment, the monomer mixture comprises from about 85% to about 99% by weight of an isoolefin monomer and from about 1% to 15% by weight of a multiolefin/β-pinene monomer. In certain embodiments, three monomers may be employed. In these embodiments, the monomer mixture may comprise about 80% to about 99% by weight of isoolefin monomer, from about 0.5% to about 5% by weight of a multiolefin/β-pinene monomer, and from about 0.5% to about 15% by weight a third monomer copolymerizable with the isoolefin and/or multiolefin/β-pinene monomers. In one embodiment, the monomer mixture comprises from about 68% to about 99% by weight of an isoolefin monomer, from about 0.5% to about 7% by weight of a multiolefin/β-pinene monomer and from about 0.5% to about 25% by weight of a third monomer copolymerizable with the isoolefin and/or multiolefin/β-pinene monomers.

The butyl rubber polymer may be prepared by any suitable method, of which several are known in the art. For example, the polymerization of monomers may be performed in the presence of $AlCl_3$ and a proton source and/or cationogen capable of initiating the polymerization process. A proton source includes any compound that will produce a proton when added to $AlCl_3$ or a composition containing $AlCl_3$. Protons may be generated from the reaction of $AlCl_3$ with proton sources such as water, alcohol or phenol to produce the proton and the corresponding by-product. Such reaction may be preferred in the event that the reaction of the proton source is faster with the protonated additive as compared with its reaction with the monomers. Other proton generating reactants include thiols, carboxylic acids, and the like. The most preferred proton source is water. The preferred ratio of $AlCl_3$ to water is between 5:1 to 100:1 by weight. It may be advantageous to further introduce $AlCl_3$ derivable catalyst systems, diethylaluminium chloride, ethylaluminium chloride, titanium tetrachloride, stannous tetrachloride, boron trifluoride, boron trichloride, or methylalumoxane. Inert solvents or diluents known to the person skilled in the art for butyl polymerization may be considered as the solvents or diluents (reaction medium). These include alkanes, chloroalkanes, cycloalkanes or aromatics, which are frequently also mono- or polysubstituted with halogens. Hexane/chloroalkane mixtures, methyl chloride, dichloromethane or the mixtures thereof may be preferred. Chloroalkanes are preferably used. The monomers are generally polymerized cationically, preferably at temperatures in the range from −120° C. to +20° C., preferably in the range from −100° C. to −20° C., and pressures in the range from 0.1 to 4 bar.

The butyl polymer may also be produced via a solution process as outlined in WO2011089083 A1 and references therein. A C6 solvent is a particularly preferred choice for use in a solution process. C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane.

The butyl rubber polymer may comprise at least 0.5 mol % repeating units derived from the multiolefin/β-pinene monomers. In some embodiments, the repeating units derived from the multiolefin/β-pinene monomers may be present in the butyl rubber polymer in an amount of at least 0.75 mol %, or at least 1.0 mol %, or at least 1.5 mol %, or at least 2.0 mol %, or at least 2.5 mol %, or at least 3.0 mol %, or at least 3.5 mol %, or at least 4.0 mol %, or at least 5.0 mol %, or at least 6.0 mol %, or at least 7.0 mol %. In one embodiment, the butyl rubber polymer may comprise from 0.5 to 2.2 mol % of the multiolefin/β-pinene monomers. In another embodiment, the butyl rubber polymer may comprise higher multiolefin/β-pinene monomer content, e.g. 3.0 mol % or greater. The preparation of suitable high multiolefin/β-pinene butyl rubber polymers is described in Canadian Patent Application 2,418,884, which is incorporated herein by reference.

In one embodiment, the halogenated butyl rubber polymer may be obtained by first preparing a butyl rubber polymer from a monomer mixture comprising one or more isoolefins, and one or more multiolefins and/or β-pinene, followed by subjecting the resulting copolymer to a halogenation process to form the halogenated butyl rubber polymer. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein. Halogenation may involve bromination and/or chlorination. Brominated butyl rubber polymers may be of particular note. For example, a brominated butyl rubber comprising isobutylene and less than 2.2 mole percent isoprene is commercially available from LANXESS Deutschland GmbH and sold under the name BB2030™.

In the halogenated butyl rubber polymers one or more of the repeating units derived from the multiolefin monomers comprise an allylic halogen moiety. During halogenation, some or all of the multiolefin and/or β-pinene content of the copolymer is converted to units comprising allylic halides. These allylic halide sites in the halobutyl rubber polymer result in repeating units derived from the multiolefin monomers and/or β-pinene originally present in the butyl rubber polymer. The total allylic halide content of the halogenated butyl rubber polymer cannot exceed the starting multiolefin and/or β-pinene content of the parent butyl rubber polymer, however residual allylic halides and/or residual multiolefins may be present. The allylic halide sites allow for reacting with and attaching one or more nucleophiles to the halobutyl rubber polymer. The halogenated butyl rubber polymer may have a total allylic halide content from 0.05 to 2.0 mol %. The halogenated butyl rubber polymer may also contain residual multiolefin levels ranging from 2 to 10 mol %.

The butyl rubber ionomers may be obtained by reacting a halogenated butyl rubber polymer with a nucleophile having no pendant vinyl group, a nucleophile comprising a pendant vinyl group or a mixture thereof. The halogenated rubber polymer may be reacted first with a nucleophile having no pendant vinyl group and then with a nucleophile having a pendant vinyl group.

Nucleophiles suitable for the preparation of the butyl rubber ionomers may contain at least one neutral phosphorus or nitrogen center, which possess a lone pair of electrons, the lone pair being both electronically and sterically accessible for participation in nucleophilic substitution reactions. The butyl rubber ionomers obtained from such nucleophiles would comprise phosphorus-based or nitrogen-based ionic moieties.

In one embodiment, the allylic halide sites of the halogenated butyl rubber polymers are reacted with nucleophiles (with or without a pendant vinyl group) having of formula (I):

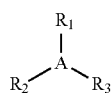
(I)

wherein,

A is a nitrogen or phosphorus; and, $R_1$, $R_2$ and $R_3$ are independently: a vinyl group, a linear or branched $C_1$-$C_{18}$ alkyl group; a linear or branched $C_1$-$C_{18}$ alkyl group comprising one or more hetero atoms selected from the group consisting of O, N, S, B, Si and P; $C_6$-$C_{10}$ aryl group; $C_3$-$C_6$ heteroaryl group; $C_3$-$C_6$ cycloalkyl group; $C_3$-$C_6$ heterocycloalkyl group; or combinations thereof. If the nucleophile has a pendant vinyl group, the vinyl group may be one of $R_1$, $R_2$ or $R_3$ or could be pendant from one or more of the $R_1$, $R_2$ or $R_3$ groups. Two or all three of the $R_1$, $R_2$ and $R_3$ moieties may be fused together.

Suitable nucleophiles include, but are not limited to trimethylamine, triethylamine, triisopropylamine, tri-n-butylamine, trimethylphosphine, triethylphosphine, triisopropylphosphine, tri-n-butylphosphine, triphenylphosphine, diphenylphosphinostyrene, allyldiphenylphosphine, diallylphenylphosphine, diphenylvinylphosphine, triallylphosphine, 2-dimethylaminoethanol, 1-dimethylamino-2-propanol, 2-(isopropylamino)ethano, 3-dimethylamino-1-propanol, N-methyldiethanolamine, 2-(diethylamino)ethanol, 2-dimethylamino-2-methyl-1-propanol, 2-[2-(dimethylamino)ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)-diethanol, tris[2-(2-methoxyethoxy)ethyl]amine, 3-(dibenzylamino)-1-propanol, N-vinyl caprolactam, N-vinyl phthalimide, 9-vinyl carbazole, N-[3-(dimethylamino)propyl]methacrylamide or mixtures thereof.

The reaction between the nucleophile and the halogenated butyl rubber polymer may be carried out at a temperature in a range of from about 60° C. to about 250° C. In one embodiment, the reaction between the nucleophile and the halogenated butyl rubber polymer may be carried out at a temperature about 80° C. to about 200° C. In another embodiment, the reaction between the nucleophile and the halogenated butyl rubber polymer may be carried out at a temperature about 100C to about 160° C. The reaction may be carried out for a time in a range of from about 0.5 to 90 minutes, preferably from 1 to 60 minutes, more preferably from 5 to 30 minutes. The amount of nucleophile reacted with the halogenated butyl rubber polymer may be in the range of from about 0.01 to 5 molar equivalents, more preferably about 0.1 to 2 molar equivalents, even more preferably about 0.5 to 1 molar equivalents, based on the total molar amount of allylic halide present in the halogenated butyl rubber polymer. The resulting butyl rubber ionomer preferably possesses from about 0.01 to 10 mol %, more preferably from about 0.1 to 5.0 mol %, even more preferably from about 0.5 to 0.8 mol % of ionomeric moieties. The resulting butyl rubber ionomer may be a mixture of the polymer-bound ionomeric moiety and allylic halide such that the total molar amount of ionomeric moiety and allylic halide functionality are present in an amount not exceeding the original allylic halide content.

The at least one elastomer is co-curable with the butyl rubber ionomer. Such elastomers include, for example, elastomers comprising one or more units of unsaturation. The one or more units of unsaturation are preferably carbon-carbon double bonds, such as in olefins and/or dienes. Diene elastomers are of particular note. The co-curable elastomer may be a butyl rubber elastomer, a non-butyl rubber elastomer or a mixture thereof. Some examples of butyl rubber elastomers include butyl rubber (IIR), bromobutyl rubber (BIIR), chlorobutyl rubber (CIIR), and mixtures thereof. Some examples of particular non-butyl rubber elastomers include isobutylene-methylstyrene (BIMS) rubber (commercially available under the trade name Exxpro™), ethylene propylene rubber (EPR), ethylene propylene diene monomer (EPDM) rubber, butadiene rubber (BR), solution styrene butadiene rubber (sSBR), emulsion styrene butadiene rubber (eSBR), acrylonitrile butadiene rubber (NBR), hydrogenated acrylonitrile butadiene rubber (HNBR), natural rubber (NR), epoxidized natural rubber (ENR), polyurethane (PU), polyisoprene rubber, polyacrylic or polyacrylate (ACM), chloroprene (CR), chlorosulphonylpolyethylene or chlorosulphonatedpolyethylene (CSM), ethylene acrylic (AEM), thermoplastic polyester urethane (AU), thermoplastic polyether urethane (EU), epichlorohydrin (ECO), fluoroethylene propylene-perfluoroalkoxy (FEP or PFA), tetrafluoroethylene/propylene (FEPM or TFE/P), perfluoroelastomer (FFKM/FFPM), fluoroelastomer or fluorocarbon (FKM/FPM), fluorosilicone (FVMQ), silicone (VMQ/PVMQ), polytetrafluoroethylene (PTFE), ethylene vinylacetate (EVA) rubber, ethylene acrylate rubber, polyurethane rubber, polyisobutylene (PIB), chlorinated polyethylene (CPE), polynorbornene rubber (PNB), polysulphide rubber (TR) and mixtures thereof. The co-curable elastomer is preferably a non-butyl rubber elastomer.

The elastomeric compound includes one or more fillers. The fillers may be non-mineral fillers, mineral fillers or mixtures thereof. Non-mineral fillers are preferred in some embodiments and include, for example, carbon blacks, rubber gels and mixtures thereof. Suitable carbon blacks are preferably prepared by lamp black, furnace black or gas black processes. Carbon blacks preferably have BET specific surface areas of 20 to 200 m²/g. Some specific examples of carbon blacks are SAF, ISAF, HAF, FEF and GPF carbon blacks. Rubber gels are preferably those based on polybutadiene, butadiene/styrene copolymers, butadiene/acrylonitrile copolymers or polychloroprene.

Suitable mineral fillers comprise, for example, silica, silicates, clay, bentonite, vermiculite, nontronite, beidelite, volkonskoite, hectorite, saponite, laponite, sauconite, magadiite, kenyaite, ledikite, gypsum, alumina, talc, glass, metal oxides (e.g. titanium dioxide, zinc oxide, magnesium oxide, aluminum oxide), metal carbonates (e.g. magnesium carbonate, calcium carbonate, zinc carbonate), metal hydroxides (e.g. aluminum hydroxide, magnesium hydroxide) or mixtures thereof.

Dried amorphous silica particles suitable for use as mineral fillers may have a mean agglomerate particle size in the range of from 1 to 100 microns, or 10 to 50 microns, or 10 to 25 microns. In one embodiment, less than 10 percent by volume of the agglomerate particles may be below 5 microns. In one embodiment, less than 10 percent by volume of the agglomerate particles may be over 50 microns in size. Suitable amorphous dried silica may have, for example, a BET surface area, measured in accordance with DIN (Deutsche Industrie Norm) 66131, of between 50 and 450 square meters per gram. DBP absorption, as measured in accordance with DIN 53601, may be between 150 and 400 grams per 100 grams of silica. A drying loss, as measured according to DIN ISO 787/11, may be from 0 to 10 percent by weight. Suitable silica fillers are commercially sold under the names HiSil™ 210, HiSil™ 233 and HiSil™ 243 available from PPG Industries Inc. Also suitable are Vulkasil™ S and Vulkasil™ N, commercially available from Bayer AG.

High aspect ratio fillers useful in the present invention may include clays, talcs, micas, etc. with an aspect ratio of at least 1:3. The fillers may include acircular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. The high aspect ratio fillers may have an aspect ratio of at least 1:5, or at least 1:7, or in a range of 1:7 to 1:200. High aspect ratio fillers may have, for example, a mean particle size in the range of from 0.001 to 100 microns, or 0.005 to 50 microns, or 0.01 to 10 microns. Suitable high aspect ratio fillers may have a BET surface area, measured in accordance with DIN (Deutsche Industrie Norm) 66131, of between 5 and 200 square meters per gram. The high aspect ratio filler may comprise a nanoclay, such as, for example, an organically modified nanoclay. Examples of nanoclays include natural powdered smectite clays (e.g. sodium or calcium montmorillonite) or synthetic clays (e.g. hydrotalcite or laponite). In one embodiment, the high aspect filler may include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment, onium ions are phosphorus based (e.g. phosphonium ions) or nitrogen based (e.g. ammonium ions) and contain functional groups having from 2 to 20 carbon atoms. The clays may be provided, for example, in nanometer scale particle sizes, such as, less than 25 µm by volume. The particle size may be in a range of from 1 to 50 µm, or 1 to 30 µm, or 2 to 20 µm. In addition to silica, the nanoclays may also contain some fraction of alumina. For example, the nanoclays may contain from 0.1 to 10 wt % alumina, or 0.5 to 5 wt % alumina, or 1 to 3 wt % alumina. Examples of commercially available organically modified nanoclays as high aspect ratio mineral fillers include, for example, those sold under the trade name Cloisite® clays 10A, 20A, 6A, 15A, 30B, or 25A.

The butyl rubber ionomer may be present in the blend in an amount of about 1-99 phr, or 1 to 90 phr or about 5-75 phr, or less than 50 phr, or about 1-50 phr, or about 1 phr to less than 50 phr, or about 10-50 phr, or about 5-30 phr, or about 15-30 phr. Fillers may be present in the blend in an amount of about 1-100 phr, or about 3-80 phr, or about 5-60 phr, or about 5-30 phr, or about 5-15 phr.

The elastomeric compound may be prepared by blending the butyl rubber ionomer, the co-curable elastomer and the filler, and then curing the blend.

Stabilizers, anti-oxidants, tackifiers, and/or other additives known to those of skill in the art may also be added to the blend in the usual way and in the normal amounts. Additionally, other additives may be added to the ionomer prior to blending with the co-curable elastomer.

Ingredients may be compounded together using conventional compounding techniques. Suitable compounding techniques include, for example, mixing the ingredients together using, for example, an internal mixer (e.g. a Banbury mixer), a miniature internal mixer (e.g. a Haake or Brabender mixer) or a two roll mill mixer. An extruder also provides good mixing, and permits shorter mixing times. It is possible to carry out the mixing in two or more stages, and the mixing can be done in different apparatuses, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding.

The choice of curing system suitable for use is not particularly restricted and is within the purview of a person skilled in the art. In certain embodiments, the curing system may be sulphur-based, peroxide-based, resin-based or ultraviolet (UV) light-based.

A sulfur-based curing system may comprise: (i) a metal oxide, (ii) elemental sulfur and (iii) at least one sulfur-based accelerator. The use of metal oxides as a component in the sulphur curing system is well known in the art. A suitable metal oxide is zinc oxide, which may be used in the amount of from about 1 to about 10 phr. In another embodiment, the zinc oxide may be used in an amount of from about 2 to about 5 phr. Elemental sulfur, (component (ii)), is typically used in amounts of from about 0.2 to about 2 phr. Suitable sulfur-based accelerators (component (iii)) may be used in amounts of from about 0.5 to about 3 phr. Non-limiting examples of useful sulfur-based accelerators include thiuram sulfides (e.g. tetramethyl thiuram disulfide (TMTD)), thiocarbamates (e.g. zinc dimethyl dithiocarbamate (ZDC)) and thiazyl or benzothiazyl compounds (e.g. mercaptobenzothiazyl disulfide (MBTS)). A sulphur based accelerator of particular note is mercaptobenzothiazyl disulfide.

Peroxide based curing systems may also be suitable, especially for butyl rubber ionomers comprising residual multiolefin content in excess of about 0.2 mol %. A peroxide-based curing system may comprises a peroxide curing agent, for example, dicumyl peroxide, di-tert-butyl peroxide, benzoyl peroxide, 2,2'-bis(tert.-butylperoxy diisopropylbenzene (Vulcup® 40KE), benzoyl peroxide, 2,5-dimethyl-2,5-di(tert-butylperoxy)-hexyne-3, 2,5-dimethyl-2,5-di (benzoylperoxy)hexane, (2,5-bis(tert-butylperoxy)-2,5-dimethyl hexane and the like. One such peroxide curing agent comprises dicumyl peroxide and is commercially available under the name DiCup 40C. Peroxide curing agents may be used in an amount of about 0.2-7 phr, or about 1-6 phr, or about 4 phr. Peroxide curing co-agents may also be used. Suitable peroxide curing co-agents include, for example, triallyl isocyanurate (TAIC) commercially available under the name DIAK 7 from DuPont, N,N'-m-phenylene dimaleimide known as HVA-2 from DuPont or Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers containing increased levels of unsaturation, for example a multiolefin content of at least 0.5 mol %.

The blend may be cured by resin cure system and, if required, an accelerator to activate the resin cure. Suitable resins include but are not limited to phenolic resins, alkyl-phenolic resins, alkylated phenols, halogenated alkyl phenolic resins and mixtures thereof.

In some cases, curing may be achieved by heating the blend at a suitable curing temperature in the presence of the curing system. The curing temperature may be about 80° C. to about 250° C., or 100° C. to about 200° C., or about 120° C. to about 180° C.

Addition of butyl rubber ionomer as an additive to a co-curable elastomer may result in improvement in one or more of green strength of the uncured blend, flex fatigue ratio, adhesion, tear strength, damping, traction and crack growth resistance.

Crack growth resistance of elastomeric compounds of the present invention, as measured by DeMattia Flexion tester (ASTM D 813), may be over 1.2 times greater, over 1.3 times greater, over 1.4 times greater, over 1.5 times greater, over 1.6 times greater, over 1.7 times greater, over 1.8 times greater, over 1.9 times greater, over 2 times greater, over 3 times greater, or even over 4 times greater, than crack growth resistance of a similar blend not containing the butyl rubber ionomer. Green strength of the uncured blend, as measured according to ASTM D6746 may be over 1.2 times greater, over 1.3 times greater, over 1.4 times greater, over 1.5 times greater, over 1.6 times greater, or even over 1.7 times greater, than green strength of a similar blend not containing the butyl rubber ionomer. Adhesion may be over 1.2 times greater, over 1.3 times greater, over 1.4 times greater, or even over 1.5 times greater than the adhesion of a similar blend not containing the butyl rubber ionomer. Tear strength as measured by Die C Tear (ASTM D 624) at 23° C. may be over 1.2 times greater, over 1.3 times greater, over 1.4 times greater, over 1.5 times greater, over 1.6 times greater, over 1.7 times greater, over 1.8 times greater, over 1.9 times greater, or even over 2 times greater than the tear strength of a similar blend not containing the butyl rubber ionomer.

The elastomeric blend may be shaped into a desired article prior to curing. Articles comprising the cured elastomeric compound include, for example, belts, hoses, shoe soles, gaskets, o-rings, wires/cables, inner tubes, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, pharmaceutical closures, seals for pump spray bottles and aerosol cans, engine mounts, body mounts, noise vibration harshness compounds useful for reducing the transference of noise and vibration for both automotive and industrial applications, adhesives, sealants, a container, such as a bottle, tote, storage tank, etc.; a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing, an air conditioning hose, diaphragms, and curing envelopes. Additional examples where the butyl ionomer blends may be used in articles or coatings include, but are not limited to, the following: appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipments, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing to minimize the problems of biofouling, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

EXAMPLES

Materials and Reagents

BB2030 (LANXESS), RB301 (LANXESS), BR (LANXESS), EPDM (LANXESS), CR (LANXESS), HNBR (LANXESS), NR (H.A. Astlett), Vulkanox (LANXESS), Vulkacit (LANXESS), Bayprene 210 (LANXESS), Butyl 301 (LANXESS), sSBR (Nippon Zeon), zinc oxide (St. Lawrence Chemical Company), carbon black (Cabot), SP1045 Resin (Schemectady Chemicals), triphenylphosphine (Alfa Aesar), dimethylaminoethanol (Sigma Aldrich), stearic acid (HM Royal), sulfur (LV.Lomas Ltd), Struktol ZB147 (Struktol), Si-69 (Evonik), Ultrasil (Evonik), Sunolite (Chemtura) were all used as received from their respective suppliers.

Compound Testing Equipment and Procedures:

TABLE 1

| Equipment/Test Method | ASTM # |
| --- | --- |
| MDR 200 (Moving Dye Rheometer) | ASTM D 5289 |
| Mooney Viscometer | ASTM D 1646 |
| DeMattia Flexion tester | ASTM D 813 |
| Alpha Technologies T2000 | ASTM D 412 |
|  | ASTM D 624 |
|  | ASTM D 6746 |
| DIN Abrasion | DIN 53 516 |
| Compression Set | ASTM D395 |
| Doli Flexometer | ASTM D623 |

Example 1

LANXESS BB2030™ was premixed with triphenylphosphine and then passed through a twin screw extruder at 160° C. Analysis of the final product by $^1$H NMR confirmed the presence of 0.2 mol % phosphonium ionic groups.

Example 2

LANXESS BB2030™ was premixed with triphenylphosphine and then passed through a twin screw extruder at 160° C. Analysis of the final product by $^1$H NMR confirmed the presence of 0.4 mol % phosphonium ionic groups.

Example 3

LANXESS BB2030™ was premixed with triphenylphosphine and then passed through a twin screw extruder at 160° C. Analysis of the final product by $^1$H NMR confirmed the presence of 0.6 mol % phosphonium ionic groups.

Example 4

LANXESS BB2030™ was premixed with triphenylphosphine and then passed through a twin screw extruder at 160°

C. Analysis of the final product by $^1$H NMR confirmed the presence of 0.8 mol % phosphonium ionic groups.

Example 5

LANXESS BB2030™ was passed through a twin screw extruder at 160° C. where N,N-dimethylaminoethanol (DMAE) was added at a rate of 0.4 mL/min. Analysis of the final product by $^1$H NMR confirmed the presence of 0.8 mol % ammonium ionic groups.

Example 6

LANXESS BB2030™ was passed through a twin screw extruder at 160° C. where N,N-dimethylaminoethanol (DMAE) was added at a rate of 0.2 mL/min. Analysis of the final product by $^1$H NMR confirmed the presence of 0.4 mol % ammonium ionic groups.

Example 7

LANXESS BB2030™ (100 phr) was added to a Banbury mixer, followed by the addition of triphenylphosphine (3 phr, 0.6 molar equivalents based on allylic bromide content) and mixed for 6 minutes. The mixture was then passed through a single screw extruder heated to 100° C. The resulting properties are shown in Table 2. Comparison of Example 3 to Example 1 and Example 2 show a lower amount of residual TPP and TPP=O. Additionally, Example 2 and Example 3 demonstrate comparable ionic content, indicating the improved efficiency of the process outlined in Example 3 (84% conversion).

Examples 8-16

Examples 8-17 were prepared according to the general formulation outlined in Table 2. Ingredient 1A was added at t=0 min, followed by 1B at t=1min and the mix dropped at 7 min. Cure package outlined in 2A was added on a room temperature mill. The samples were then cured and their physical and dynamic properties were evaluated as shown in Table 3. As evident from Table 3, partial replacement of the halobutyl rubber (LANXESS BB2030) with the Example 7 results in improved green strength, adhesion, tear and flex fatigue properties.

TABLE 2

|  |  | phr |
|---|---|---|
| LANXESS Bromobutyl 2030 | 1A | 0-100 |
| Example 7 | 1A | 100-0 |
| Stearic Acid | 1B | 1 |
| Resin SP 1068 | 1B | 4 |
| Sunpar 2280 | 1B | 7 |
| Carbon Black, N 660 | 1B | 60 |
| Sulfur | 2A | 0.5 |
| Vulkacit DM/C | 2A | 1.3 |
| Zinc Oxide | 2A | 3 |

TABLE 3

|  | 8 | 9 | 10 | 11 | 12 | 13 | 14 | 15 | 16 |
|---|---|---|---|---|---|---|---|---|---|
| LANXESS Bromobutyl 2030 | 100 | 95 | 90 | 85 | 80 | 75 | 100 | 30 | 50 |
| Example 7 | 0 | 5 | 10 | 15 | 20 | 25 | 5 | 70 | 50 |
| Green Strength (ambient temperature) | | | | | | | | | |
| Peak Stress (MPa) | 0.27 | 0.33 | 0.35 | 0.35 | 0.45 | 0.48 | 0.31 | n/a | n/a |
| Stress @ 100 (MPa) | 0.27 | 0.33 | 0.35 | 0.35 | 0.39 | 0.38 | 0.3 | n/a | n/a |
| Stress @ 300 (MPa) | 0.21 | 0.24 | 0.28 | 0.3 | 0.4 | 0.41 | 0.24 | n/a | n/a |
| M300/100 | 0.78 | 0.73 | 0.80 | 0.86 | 1.03 | 1.08 | 0.80 | n/a | n/a |
| Unaged Tensile (ambient temperature) | | | | | | | | | |
| Ultimate Tensile (MPa) | 10.9 | 11.1 | 11.1 | 11.7 | 11.8 | 11.5 | 11.3 | 13.6 | 12.8 |
| Ultimate Elongation (%) | 713 | 680 | 688 | 749 | 739 | 706 | 728 | 731 | 762 |
| Stress @ 100 (MPa) | 1.2 | 1.3 | 1.4 | 1.4 | 1.5 | 1.5 | 1.3 | 1.8 | 1.6 |
| Stress @ 300 (MPa) | 4.9 | 5.2 | 5.5 | 5.1 | 5.6 | 5.4 | 5.2 | 6.1 | 5.6 |
| M300/100 | 4.1 | 3.9 | 3.9 | 3.8 | 3.7 | 3.6 | 4.0 | 3.5 | 3.4 |
| Aged Tensile (aged 168 h @ 100° C., tested at ambient temperature) | | | | | | | | | |
| Chg. Ulti. Tens. (%) | 97 | 97 | 94 | 91 | 90 | 92 | 96 | n/a | 90 |
| Chg. Ulti. Elong. (%) | 64 | 71 | 78 | 79 | 80 | 88 | 76 | n/a | 63 |
| Change in M300/100 (%) | 74 | 71 | 81 | 81 | 82 | 112 | 83 | n/a | 118 |
| Adhesion | | | | | | | | | |
| Adhesive Strength (kNm) | 6.3 | 18.7 | 15.0 | 14.9 | 9.9 | 10.5 | 12.7 | n/a | n/a |
| Mill Shrinkage (50° C.) | | | | | | | | | |
| Compd Shrinkage (%) | 21 | 20 | 20 | 21 | 22 | 23 | 24 | n/a | n/a |

TABLE 3-continued

|  | 8 | 9 | 10 | 11 | 12 | 13 | 14 | 15 | 16 |
|---|---|---|---|---|---|---|---|---|---|
| DeMattia Flex Fatigue (ambient temperature) | | | | | | | | | |
| 300% Crack Growth (Kcycles) | 40 | 35 | 39 | 72 | 80 | 66 | 43 | >250 | >250 |
| 600% Crack Growth (Kcycles) | 168 | 165 | 151 | >250 | 236 | 225 | 138 | >250 | >250 |
| Die C Tear (ambient temperature) | | | | | | | | | |
| Tear Strength (kN/m) | 35 | 38 | 36 | 40 | 39 | 40 | n/a | 46 | 42 |

Examples 17-24

Examples 17-24 were prepared according to the general formulation outlined in Table 4. Ingredients 1A and 1B were added to the mixer, followed by 1C at t=1 min. Once the mix temperature reached 105° C., ingredients 1D were added. The batch was dropped at 140° C. Ingredient 2A was added on a room temperature mill. The samples were then cured and their physical and dynamic properties were evaluated as shown in Table 5. As evident from Table 5, partial replacement of the regular butyl (LANXESS RB301) with Example 1 or Example 3 resulted in higher modulus, improved permeability and flex fatigue properties.

TABLE 4

|  |  | phr |
|---|---|---|
| LANXESS Butyl 301 | 1A | 93.6-0 |
| Example 1 | 1A | 0-93.6 |
| Example 3 | 1A | 0-46.8 |
| Bayprene 210 | 1B | 5 |
| Carbon Black, N 330 | 1C | 50 |
| Stearic Acid | 1D | 0.5 |
| Castor Oil | 1D | 5 |
| Zinc Oxide | 1D | 5 |
| Butyl 301 TYPE IE | 1D | 6.4 |
| SP1045 Resin | 2A | 10 |

TABLE 5

|  | 17 | 18 | 19 | 20 | 21 | 22 | 23 | 24 |
|---|---|---|---|---|---|---|---|---|
| LANXESS Butyl 301 | 93.6 | 0 | 46.8 | 70.2 | 84.24 | 46.8 | 70.2 | 84.24 |
| Example 1 | 0 | 93.6 | 46.8 | 23.4 | 9.36 | 0 | 0 | 0 |
| Example 3 | 0 | 0 | 0 | 0 | 0 | 46.8 | 23.4 | 9.36 |
| Unaged Tensile (ambient temperature) | | | | | | | | |
| Ultimate Tensile (MPa) | 13.5 | 13.29 | 13.3 | 12.56 | 14.11 | 8.38 | 12.77 | 13.59 |
| Ultimate Elongation (%) | 782 | 729 | 768 | 740 | 726 | 870 | 800 | 703 |
| Stress @ 100 (MPa) | 1.54 | 1.91 | 1.67 | 1.61 | 1.86 | 1.42 | 1.53 | 1.81 |
| Stress @ 300 (MPa) | 4.24 | 5.42 | 4.51 | 4.31 | 5.34 | 2.52 | 3.19 | 4.68 |
| M300/100 | 2.75 | 2.84 | 2.70 | 2.68 | 2.87 | 1.77 | 2.08 | 2.59 |
| Permeability (ambient temperature) | | | | | | | | |
| Perm. (cc mm/[m² day]) | 168 | 133 | 147 | 155 | 161 | 132 | 152 | 159 |
| DeMattia Flex (ambient temperature) | | | | | | | | |
| 300% Crack Growth (Kc) | 63 | >250 | >250 | >250 | >250 | >250 | >250 | >250 |
| 600% Crack Growth (Kc) | 136.7 | >250 | >250 | >250 | >250 | >250 | >250 | >250 |

Examples 25-27

Examples 25-27 were prepared according to the general formulation outlined in Table 6. At the beginning of the mix, half of 1A, then 1B and then the balance of 1A were added, followed by 1C at 30 sec and 1D at 90 sec and mixed for 390 sec. The following day, the mix was put back in the mixer and 2A ingredients added, then mixed for 180 sec. Finally, ingredients 2B were added on the mill. The samples were then cured and their physical and dynamic properties were evaluated as shown in Table 7. As evident from Table 7, full and partial replacement of the bromobutyl with the Example 4 in a blend with butadiene rubber (BR) and solution styrene-butadiene rubber (sSBR) resulted in improved adhesion at higher temperatures as well as improved flex fatigue properties.

TABLE 6

|  |  | phr |
|---|---|---|
| BR | 1A | 30 |
| sSBR | 1A | 35 |
| LANXESS Bromobutyl 2030 | 1A | 0-35 |
| Example 4 | 1A | 0-35 |
| Ultrasil VN3 | 1B, 1C, 1D, | 3 × 25 |
| Carbon Black, N 234 | 1C | 5 |
| N,N-Dimethylethanolamine | 1C | 1.13 |
| Silane Si-69 | 1C | 3.5 |
| Struktol ZB 47 | 1C | 1.5 |
| Triphenylphosphine | 1C | 0-2 |
| Calsol 8240 | 1D | 25 |
| Stearic Acid | 1D | 1.5 |
| Sunolite 160 Prills | 1D | 1.25 |
| Vulkanox 4020 | 2A | 1.5 |
| Vulkanox HS/LG | 2A | 1 |

TABLE 6-continued

|  |  | phr |
|---|---|---|
| Sulfur | 3A | 1.5 |
| Vulkacit CZ/EGC | 3A | 1.75 |

TABLE 6-continued

|  |  | phr |
|---|---|---|
| Vulkacit D/C | 3A | 2 |
| Zinc Oxide | 3A | 2.5 |

TABLE 7

|  | 25 | 26 | 27 |
|---|---|---|---|
| LANXESS BB2030 | 35 | 0 | 17.5 |
| Example 4 | 0 | 35 | 17.5 |
| Dimethylaminoethanol | 1.13 | 1.13 | 1.13 |
| Triphenylphosphine | 2 | 0 | 0 |
| Mooner Viscosity (ML (1 + 8) @100° C.) | | | |
| Mooney Viscosity (MU) | 58 | 87 | 75 |
| MDR Characteristics (160° C.) | | | |
| $M_H$ (dN · m) | 25 | 23 | 28 |
| $M_L$ (dN · m) | 4 | 5 | 6 |
| Delta $M_H - M_L$ (dN · m) | 21 | 17.1 | 21.3 |
| Stress Strain (unaged, ambient temperature) | | | |
| Hardness Shore A2 (pts.) | 55 | 56 | 59 |
| Ultimate Tensile (MPa) | 13.8 | 15.4 | 15.1 |
| Ultimate Elongation (%) | 343 | 494 | 403 |
| Stress @ 100 (MPa) | 2.1 | 1.8 | 2.1 |
| Stress @ 300 (MPa) | 11.4 | 8.1 | 10.5 |
| M300/100 | 5.4 | 4.5 | 5 |
| Die C Tear (ambient temperature) | | | |
| Tear Strength (kN/m) | 37 | 36 | 39 |
| Rubber Adhesion | | | |
| Pirelli (23° C., kN/m) | 20 | 21 | 11 |
| Pirelli (100° C., kN/m) | 8 | 12 | 12 |
| Zwick Rebound | | | |
| Resilience @ 0° C. (%) | 4.2 | 6.3 | 5.6 |
| Resilience @ 23° C. (%) | 24.8 | 22.1 | 21.8 |
| Resilience @ 100° C. (%) | 44.1 | 45.7 | 48.4 |
| DeMattia Flex (2 mm punched, unaged) | | | |
| Crack Growth 300% (Kc) | 3.7 | 6 | 6.3 |
| Crack Growth 600% (Kc) | 13 | 22.5 | 21 |
| DIN Abrasion | | | |
| Volume Loss (mm³) | 132 | 158 | 130 |

Examples 28-35

Examples 28-34 were prepared the same way as Examples 25-27 as outlined above. The samples were then cured and their physical and dynamic properties were evaluated as shown in Table 8. As evident from Table 8, full and partial replacement of the bromobutyl with Example 5 or Example 6 in a blend with BR and sSBR resulted in improved adhesion at higher temperatures as well as improved flex fatigue properties.

TABLE 8

|  | 26 | 27 | 28 | 29 | 30 | 31 | 32 | 33 | 34 |
|---|---|---|---|---|---|---|---|---|---|
| LANXESS BB2030 | 35 | 0 | 17.5 | 0 | 17.5 | 0 | 17.5 | 0 | 17.5 |
| Example 5 | 0 | 35 | 17.5 | 35 | 17.5 | 0 | 0 | 0 | 0 |
| Example 6 | 0 | 0 | 0 | 0 | 0 | 35 | 17.5 | 35 | 17.5 |
| Dimethylaminoethanol | 1.13 | 0 | 0 | 0 | 0 | 0 | 0 | 0 | 0 |
| Triphenylphosphine | 2 | 0 | 0 | 2 | 2 | 0 | 0 | 2 | 2 |
| Mooney Viscosity (ML (1 + 8) @ 100° C.) | | | | | | | | | |
| Mooney Viscosity (MU) | 58 | 102 | 77 | 101 | 73 | 73 | 69 | 72 | 68 |
| MDR Characteristics (160° C.) | | | | | | | | | |
| MH (dN · m) | 25 | 23.9 | 26.2 | 23.3 | 24.7 | 26.8 | 24.7 | 25.5 | 24.2 |
| ML (dN · m) | 4.1 | 6.8 | 6.2 | 6.7 | 5.5 | 6.2 | 5.2 | 6 | 5.3 |
| Delta MH – ML (dN · m) | 21 | 17.2 | 20 | 16.6 | 19.1 | 20.5 | 19.4 | 19.5 | 18.9 |
| Stress Strain (ambient temperature) | | | | | | | | | |
| Hardness Shore A2 (pts.) | 55 | 58 | 60 | 57 | 56 | 57 | 55 | 55 | 53 |
| Ultimate Tensile (MPa) | 13.8 | 15.6 | 14.6 | 15.1 | 16.3 | 14.4 | 13.9 | 13.6 | 14.1 |
| Ultimate Elongation (%) | 343 | 428 | 394 | 425 | 404 | 364 | 354 | 321 | 342 |
| Stress @ 100 (MPa) | 2.1 | 2.1 | 2.2 | 2 | 2.2 | 2.2 | 2.1 | 2.3 | 2.1 |
| Stress @ 300 (MPa) | 11.4 | 9.5 | 10.3 | 9.2 | 10.8 | 11.4 | 11 | 12.2 | 12 |
| M300/100 | 5.4 | 4.5 | 4.7 | 4.6 | 4.9 | 5.2 | 5.2 | 5.3 | 5.7 |
| Die C Tear (ambient temperature) | | | | | | | | | |
| Tear Strength (kN/m) | 37 | 35 | 36 | 35 | 34 | 34.2 | 35 | 35 | 34.7 |
| Rubber Adhesion (ambient temperature) | | | | | | | | | |
| Pirelli (23° C., kN/m) | 20 | 9 | 11 | 25 | 10 | 19 | 20 | 24 | 22 |
| Pirelli (100° C., kN/m) | 8 | 11 | 11 | 20 | 12 | 10 | 11 | 9 | 7 |
| Zwick Rebound | | | | | | | | | |
| Resilience @ 0° C. (%) | 4.2 | 4.8 | 4.5 | 3.6 | 3.7 | 12.3 | 12.3 | 11 | 11.1 |
| Resilience @ 23° C. (%) | 24.8 | 20.4 | 20.7 | 22.2 | 22.8 | 21.9 | 22.5 | 22.7 | 23.3 |

TABLE 8-continued

|  | 26 | 27 | 28 | 29 | 30 | 31 | 32 | 33 | 34 |
|---|---|---|---|---|---|---|---|---|---|
| Resilience @ 100° C. (%) | 44.1 | 47 | 46.1 | 46.1 | 46.3 | 53.5 | 52.8 | 52.5 | 52.5 |
| Dimattia Flex (2 mm punched, ambient temperature) | | | | | | | | | |
| Crack Growth 300% (Kc) | 3.7 | 5.9 | 5.5 | 5.5 | 6 | 7.7 | 4.8 | 4.2 | 4.4 |
| Crack Growth 600% (Kc) | 13 | 52.2 | 42.2 | 27.5 | 35.6 | 37.9 | 21.9 | 17.8 | 17.9 |
| DIN Abrasion (ambient temperature) | | | | | | | | | |
| Volume Loss (mm³) | 132 | 136 | 121 | 142 | 114 | 134 | 121 | 120 | 109 |

Examples 35-42

Examples 35-42 were prepared according to the general formulation outlined in Table 9. The elastomer(s) 1A were added to the mixer, at 30 sec 1B was added and at 90 sec 1C was added. Curatives (2A) were added on the mill. The samples were then cured and their physical and dynamic properties were evaluated as shown in Table 10. As evident from Table 10, partial replacement of the EPDM with Example 7 resulted in improved tear strength and improved flex fatigue properties.

TABLE 9

|  |  | phr |
|---|---|---|
| EPDM | 1A | 100-50 |
| Example 7 | 1A | 0-50 |
| LANXESS BB2030 | 1A | 0-50 |
| Process Aid | 1B | 2 |
| Carbon Black, N 330 | 1B | 70 |
| Antioxidant | 1C | 1 |
| Oil | 1C | 15 |
| Peroxide | 2A | 5 |
| Coagent | 2A | 3 |

TABLE 10

|  | 35 | 36 | 37 | 38 | 39 | 40 | 41 | 42 |
|---|---|---|---|---|---|---|---|---|
| EPDM | 100 | 90 | 80 | 70 | 95 | 50 | 95 | 80 |
| Example 7 | 0 | 10 | 20 | 30 | 5 | 50 | 0 | 0 |
| LANXESS BB2030 | 0 | 0 | 0 | 0 | 0 | 0 | 5 | 20 |
| MDR Cure Characteristics (170° C.) | | | | | | | | |
| MH (dN · m) | 39.5 | 30.0 | 26.1 | 21.8 | 34.7 | n/a | 35.5 | 30.4 |
| ML (dN · m) | 4.0 | 4.1 | 4.2 | 4.0 | 4.0 | n/a | 3.9 | 4.0 |
| Delta MH – ML (dN · m) | 35.6 | 25.9 | 21.9 | 17.8 | 30.7 | n/a | 31.6 | 26.4 |
| t' 90 (min) | 7.0 | 6.2 | 6.9 | 8.2 | 6.3 | n/a | 6.1 | 6.0 |
| Compound Mooney Viscosity (ML (1 + 8) @ 100° C.) | | | | | | | | |
| Mooney Viscosity (MU) | 99.8 | 106.4 | 110.1 | 110.6 | 102.5 | n/a | 98.1 | 96.5 |
| Unaged Stress Strain (ambient temperature) | | | | | | | | |
| Hardness Shore A2 (pts.) | 71 | 71 | 68 | 70 | 70 | n/a | 71 | 71 |
| Ultimate Tensile (MPa) | 20.75 | 17.34 | 15.40 | 14.80 | 18.19 | n/a | 19.45 | 16.70 |
| Ultimate Elongation (%) | 410 | 502 | 547 | 605 | 427 | n/a | 449 | 481 |
| Stress @ 100 (MPa) | 2.78 | 2.24 | 2.12 | 2.01 | 2.38 | n/a | 2.48 | 2.26 |
| Stress @ 300 (MPa) | 14.14 | 8.54 | 7.04 | 6.22 | 10.94 | n/a | 11.53 | 8.95 |
| M300/100 | 5.09 | 3.81 | 3.32 | 3.09 | 4.60 | n/a | 4.65 | 3.96 |
| Die C Tear Strength (ambient temperature) | | | | | | | | |
| Tear Strength (kN/m) | 33.5 | 37.2 | 38.6 | 40.4 | 34.0 | n/a | 33.4 | 33.0 |
| Compression Set (aged 22 h @ 150° C.) | | | | | | | | |
| Compression Set (%) | 27 | 36 | 43 | 55 | 30 | n/a | 28 | 38 |
| Demattia Flex Test (ambient temperature) | | | | | | | | |
| Crack Growth 600% (Kc) | 7.8 | >250 | >250 | >250 | 15.1 | n/a | 24.4 | 27 |
| Crack Growth 300% (Kc) | 2.1 | 5 | >250 | >250 | 2.8 | n/a | 3.2 | 4.1 |

Examples 43-51

Examples 43-49 were prepared according to the general formulation outlined in Table 11. The elastomer(s) 1A were added to the mixer, at 150 sec 1B was added and at 210 sec 1C was added. Curatives (2A) were added on the mill. The samples were then cured and their physical and dynamic properties were evaluated as shown in Table 12. As evident from Table 12, partial replacement of the BR and bromobutyl with Example 4 or Example 5 resulted in improved modulus and abrasion resistance.

TABLE 11

|  |  | phr |
|---|---|---|
| NBR | 1A | 20 |
| BR | 1A | 66-40 |
| LANXESS Bromobutyl 2030 | 1A | 14-0 |
| Example 4 | 1A | 0-40 |
| Example 5 | 1A | 0-40 |
| Ultrasil | 1A | 40 |
| Antioxidant | 1A | 0.7 |
| Process Aides (Wax, aliphatic hydrocarbon resin, PEG) | 1B | 5.1 |
| Stearic Acid | 1C | 0.5 |
| Accelerator | 2A | 2.15 |
| Sulphur | 2A | 1.65 |
| Zinc Oxide | 2A | 4 |

TABLE 12

|  | 43 | 44 | 45 | 46 | 47 | 48 | 49 |
|---|---|---|---|---|---|---|---|
| BR | 66 | 66 | 50 | 40 | 66 | 50 | 40 |
| NBR | 20 | 20 | 20 | 20 | 20 | 20 | 20 |
| LANXESS Bromobutyl 2030 | 14 |  |  |  |  |  |  |
| Example 5 |  | 14 | 30 | 40 |  |  |  |
| Example 4 |  |  |  |  | 14 | 30 | 40 |
| MDR Cure Characteristics (160° C.) | | | | | | | |
| MH (dN · m) | 31.9 | 33.71 | 33.1 | 31.21 | 31.86 | 27.62 | 25.17 |
| ML (dN · m) | 7.71 | 9.03 | 9.42 | 9.8 | 8.67 | 7.55 | 7.43 |
| Delta MH − ML (dN · m) | 24.19 | 24.68 | 23.68 | 21.41 | 23.19 | 20.07 | 17.74 |
| t' 90 (min) | 10.08 | 8.67 | 7.43 | 7.14 | 5.75 | 2.96 | 2.26 |
| Mooney Viscosity ML (1 + 8) @ 100° C.) | | | | | | | |
| Mooney Viscosity (MU) | 90 | 110 | 117 | 145 | 131 | 150 | 110 |
| Stress Strain (ambient temperature) | | | | | | | |
| Hardness Shore A2 (pts.) | 57 | 60 | 60 | 60 | 59 | 61 | 60 |
| Ultimate Tensile (MPa) | 10.46 | 11.1 | 12.42 | 13.4 | 11.99 | 11.86 | 10.04 |
| Ultimate Elongation (%) | 669 | 592 | 535 | 538 | 675 | 601 | 475 |
| Stress @ 100 (MPa) | 1.24 | 1.37 | 1.64 | 1.62 | 1.31 | 1.77 | 1.72 |
| Stress @ 300 (MPa) | 3.26 | 4.14 | 5.35 | 5.14 | 3.64 | 5.13 | 5.72 |
| M300/100 | 2.6 | 3.0 | 3.3 | 3.2 | 2.8 | 2.9 | 3.3 |
| DIN Abrasion (ambient temperature) | | | | | | | |
| Abrasion Volume Loss (mm³) | 60 | 46 | 53 | 65 | 50 | 57 | 59 |

Examples 50-57

Examples 50-57 were prepared according to the general formulation outlined in Table 13. The amounts are phr. The elastomer(s) 1A were added to the mixer, at 60 sec 1B was added and at 90 sec 1C was added. Curatives (2A) were added on the mill. The samples were then cured and their physical and dynamic properties were evaluated as shown in Table 14. As evident from Table 14, partial replacement of the RB301 with Example 7 resulted in improved modulus and damping.

TABLE 13

|  |  | phr |
|---|---|---|
| LANXESS Butyl 301 | 1A | 100-0 |
| Example 7 | 1A | 0-100 |
| Stearic Acid | 1A | 1 |
| Marklube 160 Prills | 1A | 2 |
| Zinc Oxide | 1B | 5 |
| Carbon Black, N 550 | 1B | 45 |
| Sunpar 2280 | 1C | 26 |
| DPPT | 2A | 1.5 |
| Vulkacit DM/C (MBTS) | 2A | 1 |
| Sulfur | 2A | 1.5 |
| TMTD | 2A | 1.5 |

TABLE 14

|  | 50 | 51 | 52 | 53 | 54 | 55 | 56 | 57 |
|---|---|---|---|---|---|---|---|---|
| LANXESS Butyl 301 | 100 | 99 | 95 | 90 | 75 | 50 | 40 | 0 |
| Example 7 | 0 | 1 | 5 | 10 | 25 | 50 | 60 | 100 |
| Compound Mooney Viscosity | | | | | | | | |
| Mooney Viscosity (MU) | 38 | 40 | 43 | 40 | 41 | 43 | 49 | 46 |
| MDR Cure Characteristics | | | | | | | | |
| Delta MH − ML (dN · m) | 12.9 | 12.6 | 12.82 | 11.68 | 10.61 | 8.97 | 8.31 | 6.55 |
| ts 2 (min) |  | 5.01 | 4.4 | 4.74 | 4.39 | 3.93 | 3.4 | 3.27 | 3 |
| t' 90 (min) |  | 17.63 | 15.5 | 17.5 | 17.19 | 17.46 | 20.24 | 17.4 | 16.53 |
| Unaged Stress Strain (ambient temperature) | | | | | | | | |
| Hardness Shore A2 (pts.) | 53 | 52 | 52 | 47 | 44 | 42 | 42 | 43 |

TABLE 14-continued

|  | 50 | 51 | 52 | 53 | 54 | 55 | 56 | 57 |
|---|---|---|---|---|---|---|---|---|
| Ultimate Tensile (MPa) | 12.2 | 11.24 | 11.7 | 13 | 13.8 | 12.7 | 12.8 | 12.3 |
| Ultimate Elongation (%) | 675 | 644 | 631 | 694 | 736 | 734 | 680 | 902 |
| Stress @ 100 (MPa) | 1.1 | 1.7 | 1.2 | 1.1 | 1.1 | 1 | 1.3 | 0.9 |
| Stress @ 300 (MPa) | 3.5 | 4.4 | 4.1 | 4.2 | 4.2 | 3.8 | 4.2 | 2.9 |
| M300/100 | 3.18 | 2.6 | 3.42 | 3.82 | 3.82 | 3.80 | 3.23 | 3.22 |
| Stress Strain (aged 22 hrs @ 70° C., measured at ambient temperature) | | | | | | | | |
| Hardness Shore A2 (pts.) | 52.2 | 50.2 | 49.5 | 49.1 | 43.4 | 41.5 | 48.6 | 43.1 |
| Ultimate Tensile (MPa) | 11.6 | 8.2 | 11.8 | 12.7 | 13.5 | 13.4 | 10.9 | 11.6 |
| Ultimate Elongation (%) | 715 | 423 | 599 | 662 | 722 | 733 | 585 | 857 |
| Stress @ 100 (MPa) | 1.2 | 1.87 | 1.2 | 1.2 | 1.1 | 1.1 | 1.5 | 0.9 |
| Stress @ 200 (MPa) | 2.4 | 3.62 | 2.6 | 2.6 | 2.5 | 2.5 | 3.4 | 1.8 |
| Stress @ 300 (MPa) | 3.6 | 5.20 | 4.2 | 4.2 | 4.3 | 4.1 | 5.1 | 3.1 |
| M300/100 | 3.00 | 2.8 | 3.50 | 3.50 | 3.91 | 3.73 | 3.4 | 3.44 |
| Compression Set | | | | | | | | |
| Compression Set (%) | 26 | 22 | 24 | 25 | 23 | 24 | 25 | 33 |
| Damping | | | | | | | | |
| tan d @ 1 Hz | 0.15 | 0.17 | 0.15 | 0.15 | 0.14 | 0.16 | 0.17 | 0.15 |
| tan d @ 5 Hz | 0.19 | 0.21 | 0.22 | 0.22 | 0.22 | 0.22 | 0.22 | 0.21 |
| tan d @ 10 Hz | 0.24 | 0.25 | 0.25 | 0.26 | 0.26 | 0.27 | 0.27 | 0.26 |
| tan d @ 50 Hz | 0.40 | 0.4 | 0.42 | 0.44 | 0.48 | 0.50 | 0.47 | 0.46 |
| tan d @ 70 Hz | 0.43 | 0.45 | 0.48 | 0.5 | 0.54 | 0.56 | 0.53 | 0.43 |

Examples 58-62

Examples 58-62 were prepared according to the general formulation outlined in Table 15. The elastomer(s) 1A were added to the mixer, at 30 sec 1B was added and at 60 sec 1C was added. Curatives (2A) were added on the mill. The samples were then cured and their physical and dynamic properties were evaluated as shown in Table 16. As evident from Table 16, partial replacement of the BBX2 with Example 7 resulted in improved traction.

TABLE 15

| LANXESS Bromobutyl X2 | 1A | 100-50 |
|---|---|---|
| Example 7 | 1A | 0-50 |
| Struktol 40 MS Flakes | 1B | 5 |
| Stearic Acid | 1C | 1 |
| Zeosil 1165 MP | 1C | 60 |
| Silane Struktol SCA 985 | 1C | 3.6 |
| Carbowax 3350 | 1C | 0.9 |
| Spider Sulfur | 2A | 1.5 |
| Zinc Oxide | 2A | 3 |
| Vulkacit CZ/EGC | 2A | 1.75 |

TABLE 16

|  | 58 | 59 | 60 | 61 | 62 |
|---|---|---|---|---|---|
| LANXESS Bromobutyl X2 | 100 | 90 | 70 | 60 | 50 |
| Example 7 | 0 | 10 | 30 | 40 | 50 |
| MDR Cure Characteristics (160° C.) | | | | | |
| Delta MH – ML (dN · m) | 20.66 | 18.07 | 17.02 | 15.75 | 13.89 |
| t' 90 (min) | 12.36 | 13.18 | 16.2 | 14.19 | 14.03 |
| Compound Mooney Viscosity (ML (1 + 8) @ 100° C.) | | | | | |
| Mooney Viscosity (MU) | 127.5 | 151.4 | 129.8 | 141.3 | 159.3 |
| Stress Strain (ambient temperature) | | | | | |
| Hardness Shore A2 (pts.) | 65 | 65 | 68 | 67 | 67 |
| Ultimate Tensile (MPa) | 22.94 | 23.65 | 15.88 | 17.26 | 18.27 |
| Ultimate Elongation (%) | 474.6 | 476.2 | 331.1 | 359.7 | 355.3 |
| Stress @ 100 (MPa) | 2.4 | 3.48 | 4.04 | 3.62 | 4.88 |

TABLE 16-continued

|  | 58 | 59 | 60 | 61 | 62 |
|---|---|---|---|---|---|
| Stress @ 200 (MPa) | 7.29 | 9.38 | 9.26 | 8.66 | 10.31 |
| Stress @ 300 (MPa) | 14.24 | 16.05 | 15.01 | 14.37 | 15.86 |
| M300/M100 | 5.9 | 4.6 | 3.7 | 4.0 | 3.3 |
| DIN Abrasion (ambient temperature) | | | | | |
| Abrasion Volume Loss (mm³) | 66 | 69 | 83 | 84 | 87 |
| Traction | | | | | |
| tan d @ 1 Hz | 0.17 | 0.18 | 0.16 | 0.17 | 0.17 |
| tan d @ 5 Hz | 0.23 | 0.24 | 0.24 | 0.24 | 0.25 |
| tan d @ 10 Hz | 0.30 | 0.29 | 0.33 | 0.33 | 0.35 |
| tan d @ 50 Hz | 0.48 | 0.48 | 0.50 | 0.52 | 0.55 |
| tan d @ 70 Hz | 0.5 | 0.58 | 0.59 | 0.62 | 0.67 |

Examples 63-66

Examples 63-66 were prepared according to the general formulation outlined in Table 17. The elastomer(s) 1A were added to the mixer, at 30 sec 1B was added and at 60 sec 1C was added. Curatives (2A) were added on the mill. The samples were then cured and their physical and dynamic properties were evaluated as shown in Table 18. As evident from Table 18, partial replacement of the natural rubber with Example 7 resulted in improved tear strength, flex fatigue and damping.

TABLE 17

|  |  | phr |
|---|---|---|
| Natural Rubber SIR20 | 1A | 70-100 |
| Example 7 | 1A | 0-30 |
| Carbon Black, N 774 | 1B | 50 |
| 6PPD | 1C | 1 |
| Oil | 1C | 5 |
| Stearic Acid | 1C | 1 |
| Vulkanox HS/LG | 1C | 0.5 |
| DPG | 2A | 1.5 |
| Vulkacit Thiuram/C | 2A | 0.5 |
| Vulkacit CZ/EGC | 2A | 3 |

TABLE 17-continued

|  |  | phr |
|---|---|---|
| Zinc Oxide | 2A | 3 |
| Sulfur | 2A | 0.3 |

TABLE 18

| Example | 63 | 64 | 65 | 66 |
|---|---|---|---|---|
| Natural Rubber SIR20 | 100 | 90 | 80 | 70 |
| Example 7 | 0 | 10 | 20 | 30 |
| Compound Mooney Viscosity (ML (1 + 4 + 4) @ 100° C.) | | | | |
| Mooney Viscosity (MU) | 34 | 42 | 48 | 66 |
| Compound Mooney Scorch (ML @ 125° C.) | | | | |
| t Value t35 (min) | 9 | 9 | 8 | 8 |
| t Value t05 (min) | 7 | 7 | 6 | 3 |
| MDR Cure Characteristics (160° C.) | | | | |
| $M_H$ (dN · m) | 18 | 16 | 14 | 12 |
| $M_L$ (dN · m) | 2 | 2 | 3 | 3 |
| Delta $M_H - M_L$ (dN · m) | 17 | 14 | 12 | 9 |
| t' 90 (min) | 3 | 3 | 4 | 5 |
| Stress Strain (ambient temperature) | | | | |
| Hardness Shore A2 (pts.) | 52 | 52 | 51 | 52 |
| Ultimate Tensile | 23.0 | 21.6 | 20.6 | 16.8 |
| Ultimate Elongation (%) | 550 | 611 | 640 | 607 |
| Stress @ 100 (MPa) | 1.7 | 1.6 | 1.5 | 1.6 |
| Stress @ 200 (MPa) | 4.4 | 3.8 | 3.3 | 3.3 |
| Stress @ 300 (MPa) | 8.2 | 6.2 | 5.5 | 5.3 |
| Aged Stress Strain (168 h at 100° C., measured at ambient temperature) | | | | |
| Hardness Shore A2 (pts.) | 54 | 53 | 53 | 51 |
| Ultimate Tensile (MPa) | 14.0 | 13.8 | 12.9 | 12.6 |
| Ultimate Elongation (%) | 371 | 443 | 458 | 481 |
| Stress @ 100 (MPa) | 2.3 | 2.2 | 2.2 | 2.0 |
| Stress @ 200 (MPa) | 5.7 | 5.0 | 4.7 | 4.1 |
| Stress @ 300 (MPa) | 10.2 | 8.0 | 7.2 | 6.3 |
| Die C Tear (ambient temperature) | | | | |
| Tear Strength (kN/m) | 49 | 58 | 62 | 45 |
| Aged Tear Strength - 168 h @ 100° C. (kN/m) | 25 | 38 | 43 | 34 |
| Compression Set -Method B (aged 70 h @ 100° C., measured at ambient temp) | | | | |
| Compression Set (%) | 49 | 50 | 49 | 53 |
| Demattia Flex Test (aged 168 h @ 100° C., measured at ambient temperature) | | | | |
| Crack Growth Aged 300% (kc) | 38 | 55 | 81 | 82 |
| Crack Growth Aged 600% (kc) | 80 | 113 | 182 | 187 |
| GABO | | | | |
| tan delta @ 0.1 Hz | 0.094 | 0.11 | 0.12 | 0.14 |
| tan delta @ 1 Hz | 0.14 | 0.15 | 0.16 | 0.15 |
| tan delta @ 10 Hz | 0.15 | 0.18 | 0.17 | 0.16 |

Examples 67-69

Examples 67-69 were prepared according to the general formulation outlined in Table 19. The elastomer(s) 1A were added to the mixer and at 60 sec 1B was added. Curatives (2A) were added on the mill. The samples were then cured and their physical and dynamic properties were evaluated as shown in Table 20. As evident from Table 20, partial replacement of the CR with Example 7 resulted in improved flex fatigue.

TABLE 19

| Example 7 | 1A | 0-20 |
|---|---|---|
| Baypren 116 | 1A | 100-80 |
| DOS | 1B | 10 |
| Carbon Black N550 | 1B | 65 |
| Vulkanox 3100 | 1B | 2 |
| Rhenofit OCD | 1B | 3 |
| Vulkanox Mb2 | 1B | 0.3 |
| Stearic Acid | 1B | 1 |
| Magnesium Oxide | 1B | 4 |
| Zinc Oxide | 2A | 5 |
| Rhenogran TMTD-75 | 2A | 1 |
| Rhenogran ETU-80 | 2A | 1 |

TABLE 20

| Example | 67 | 68 | 69 |
|---|---|---|---|
| Example 7 | 0 | 10 | 20 |
| Baypren 116 | 100 | 90 | 80 |
| MDR Cure Characteristics (180° C.) | | | |
| MH (dN · m) | 34 | 32 | 28 |
| ML (dN · m) | 3 | 4 | 4 |
| Delta MH - ML (dN · m) | 31 | 28 | 24 |
| t' 90 (min) | 5 | 3 | 3 |
| Stress Strain (ambient temperature) | | | |
| Ultimate Tensile | 20.3 | 17.0 | 13.9 |
| Ultimate Elongation (%) | 249 | 232 | 300 |
| Stress @ 25 (MPa) | 1.9 | 2.0 | 1.5 |
| Stress @ 50 (MPa) | 3.2 | 3.3 | 2.3 |
| Stress @ 100 (MPa) | 7.4 | 7.3 | 4.6 |
| Aged Stress Strain (air - 72 h at 100° C., measured at ambient temp) | | | |
| Ultimate Tensile (MPa) | 21.5 | 16.7 | 14.0 |
| Ultimate Elongation (%) | 216 | 192 | 226 |
| Stress @ 25 (MPa) | 2.6 | 2.7 | 2.1 |
| Stress @ 50 (MPa) | 4.5 | 4.6 | 3.2 |
| Stress @ 100 (MPa) | 9.8 | 9.7 | 6.4 |
| Aged Stress Strain (air - 168 h at 100° C., measured at ambient temp) | | | |
| Ultimate Tensile (MPa) | 19.2 | 15.5 | 15.1 |
| Ultimate Elongation (%) | 189 | 170 | 216 |
| Stress @ 25 (MPa) | 3.0 | 3.1 | 2.5 |
| Stress @ 50 (MPa) | 5.2 | 5.2 | 4.1 |
| Stress @ 100 (MPa) | 10.8 | 10.4 | 8.3 |
| Aged Stress Strain (IRM 901 oil - 168 h at 100° C., measured at ambient temp) | | | |
| Ultimate Tensile (MPa) | 20.8 | 17.3 | 15.3 |
| Ultimate Elongation (%) | 202 | 180 | 220 |
| Stress @ 25 (Mpa) | 2.3 | 1.8 | 1.2 |
| Stress @ 50 (Mpa) | 4.2 | 3.7 | 2.4 |
| Stress @ 100 (Mpa) | 9.7 | 9.1 | 6.1 |
| Die C Tear (measured at ambient temperature) | | | |
| Tear Strength (kN/m) | 34 | 32 | 33 |
| Compression Set -Method B (ambient temperature) | | | |
| Compression Set (%) (aged 22 h @ 100° C.) | 21 | 25 | 28 |
| Compression Set (%) (aged 70 h @ 100° C.) | 33 | 41 | 42 |
| Demattia Flex Test (aged 168 h @ 100° C., measured at ambient temp) | | | |
| Crack Growth Aged 600% (kc) | 100 | 100 | 4000 |

Examples 70-72

Examples 70-72 were prepared according to the general formulation outlined in Table 21. The elastomer(s) 1A were added to the mixer and at 60 sec 1B was added. Curatives (2A) were added on the mill. The samples were then cured and their physical and dynamic properties were evaluated as shown in Table 22. As evident from Table 22, partial replacement of the HNBR with Example 7 resulted in improved flex fatigue.

TABLE 21

|  |  | phr |
|---|---|---|
| Example 7 | 1A | 0-20 |
| Therban 3406 | 1A | 100-80 |
| Carbon Black, N 500 | 1B | 65 |
| Zinc Oxide | 1B | 2 |
| Rhenofit OCD | 1B | 1 |
| Vulkanox ZMB | 1B | 1 |
| Stearic Acid | 1B | 1 |
| Magnesium Oxide | 1B | 2 |
| Dicup 40C | 2A | 8 |
| Rhenofit TAIC-72 | 2A | 1.5 |

TABLE 22

| Example | 70 | 71 | 72 |
|---|---|---|---|
| Example 7 | 0 | 10 | 20 |
| Therban 3406 | 100 | 90 | 80 |
| MDR Cure Characteristics (180° C.) | | | |
| MH (dN · m) | 45 | 41 | 39 |
| ML (dN · m) | 4 | 5 | 6 |
| Delta MH – ML (dN · m) | 41 | 36 | 33 |
| t' 90 (min) | 3 | 3 | 3 |
| Stress Strain | | | |
| Ultimate Tensile | 25.4 | 21.9 | 20.8 |
| Ultimate Elongation (%) | 275 | 264 | 246 |
| Stress @ 25 (MPa) | 1.9 | 1.9 | 1.9 |
| Stress @ 50 (MPa) | 3.2 | 3.2 | 3.2 |
| Stress @ 100 (MPa) | 8.5 | 8.3 | 8.4 |
| Aged Stress Strain (air - 72 h at 100° C.) | | | |
| Ultimate Tensile (MPa) | 26.2 | 23.7 | 20.6 |
| Ultimate Elongation (%) | 199 | 191 | 147 |
| Stress @ 25 (MPa) | 3.6 | 4.0 | 3.9 |
| Stress @ 50 (MPa) | 6.9 | 7.5 | 7.6 |
| Stress @ 100 (MPa) | 15.4 | 15.4 | 15.9 |
| Aged Stress Strain (air - 168 h at 100° C.) | | | |
| Ultimate Tensile (MPa) | 26 | 23 | 20 |
| Ultimate Elongation (%) | 193 | 183 | 159 |
| Stress @ 25 (MPa) | 4.0 | 4.0 | 4.1 |

TABLE 22-continued

| Example | 70 | 71 | 72 |
|---|---|---|---|
| Stress @ 50 (MPa) | 7.6 | 7.6 | 7.8 |
| Stress @ 100 (MPa) | 15.9 | 15.6 | 15.8 |
| Aged Stress Strain (IRM 901 oil - 168 h at 100° C.) | | | |
| Ultimate Tensile (MPa) | 25.8 | 23.2 | 19.9 |
| Ultimate Elongation (%) | 243 | 201 | 173 |
| Stress @ 25 (MPa) | 1.9 | 1.8 | 1.4 |
| Stress @ 50 (MPa) | 3.4 | 3.5 | 3.1 |
| Stress @ 100 (MPa) | 9.4 | 10.3 | 9.9 |
| Die C Tear | | | |
| Tear Strength (kN/m) | 37 | 36 | 33 |
| Compression Set -Method B | | | |
| Compression Set (%) (aged 22 h @ 150° C.) | 20 | 19 | 24 |
| Compression Set (%) (aged 70 h @ 100° C.) | 28 | 30 | 31 |
| Demattia Flex Test (aged 168 h @ 100° C.) | | | |
| Crack Growth Aged 600% (kc) | 400 | 800 | 200 |

Examples 73-78

Examples 73-78 were prepared according to the general formulation outlined in Table 23. The elastomer(s) 1A were added to the mixer and at 60 sec 1B was added. Curatives (2A) were added on the mill. The samples were then cured and their physical and dynamic properties were evaluated as shown in Table 24. As evident from Table 24, partial replacement of the regular butyl with Example 7 resulted in improved green strength, tack, tear strength and crack growth resistance.

TABLE 23

|  |  | phr |
|---|---|---|
| LANXESS Butyl 301 | 1A | 100-70 |
| LANXESS Bromobutyl 2030 | 1A | 0-10 |
| Example 7 | 1A | 0-30 |
| Zinc Oxide | 1B | 3 |
| Stearic Acid | 1B | 1 |
| Sunpar 2280 | 1B | 25 |
| Carbon Black, N 660 | 1B | 70 |
| Spider Sulfur | 2A | 1.25 |
| Vulkacit DM/C | 2A | 0.5 |
| Vulkacit Thiuram/C | 2A | 1.2 |

TABLE 24

| | Example | | | | | |
|---|---|---|---|---|---|---|
|  | 73 | 74 | 75 | 76 | 77 | 78 |
| LANXESS BUTYL 301 | 100 | 90 | 90 | 80 | 80 | 70 |
| LANXESS BROMOBUTYL 2030 | 0 | 10 | 0 | 10 | 0 | 0 |
| Example 7 | 0 | 0 | 10 | 10 | 20 | 30 |
| Compound Mooney Viscosity (ML(1 + 4 + 4) @ 100° C.) | | | | | | |
| Mooney Viscosity (MU) | 50 | 49 | 54 | 52 | 54 | 56 |
| Compound Mooney Scorch (ML @ 125° C.) | | | | | | |
| t Value t35 (min) | >30 | >30 | >30 | >30 | >30 | >30 |
| t Value t05 (min) | >30 | >30 | >30 | >30 | >30 | >30 |
| MDR Cure Characteristics (160° C.) | | | | | | |
| $M_H$ (dN · m) | 15 | 14 | 14 | 13 | 13 | 12 |
| $M_L$ (dN · m) | 2 | 2 | 2 | 2 | 2 | 2 |
| Delta $M_H$ – $M_L$ (dN · m) | 13 | 12 | 12 | 11 | 11 | 10 |
| t' 90 (min) | 4 | 4 | 4 | 4 | 4 | 4 |

TABLE 24-continued

| | Example | | | | | |
|---|---|---|---|---|---|---|
| | 73 | 74 | 75 | 76 | 77 | 78 |
| Green Strength | | | | | | |
| Peak Stress (MPa) | 0.18 | 0.17 | 0.27 | 0.27 | 0.33 | 0.38 |
| Stress Strain | | | | | | |
| Hardness Shore A2 (pts.) | 48 | 48 | 49 | 49 | 48 | 48 |
| Ultimate Tensile | 12.4 | 12.1 | 12.6 | 12.4 | 12.2 | 12.5 |
| Ultimate Elongation (%) | 672 | 639 | 654 | 671 | 653 | 653 |
| Stress @ 100 (MPa) | 1.4 | 1.4 | 1.6 | 1.5 | 1.6 | 1.6 |
| Stress @ 200 (MPa) | 2.8 | 3.1 | 3.5 | 3.2 | 3.7 | 3.7 |
| Stress @ 300 (MPa) | 4.2 | 5.0 | 5.3 | 5.0 | 5.6 | 5.7 |
| Aged Stress Strain (168 h at 100° C.) | | | | | | |
| Hardness Shore A2 (pts.) | 56 | 55 | 58 | 59 | 54 | 56 |
| Ultimate Tensile (MPa) | 10.9 | 11.1 | 10.9 | 10.8 | 11.0 | 11.1 |
| Ultimate Elongation (%) | 540 | 515 | 488 | 533 | 519 | 527 |
| Stress @ 100 (MPa) | 2.1 | 2.2 | 2.6 | 2.4 | 2.3 | 2.4 |
| Stress @ 200 (MPa) | 4.3 | 4.7 | 5.2 | 4.9 | 4.9 | 5.2 |
| Stress @ 300 (MPa) | 6.1 | 6.6 | 7.0 | 6.7 | 7.0 | 7.1 |
| Permanent Set | | | | | | |
| Unaged Permanent Set (%) | 12 | 12 | 14 | 13 | 12 | 10 |
| Aged Perm. Set (168 h @ 100° C.; %) | 12 | 12 | 12 | 12 | 12 | 13 |
| Tel Tack | | | | | | |
| Tack to self | 38 | 36 | 41 | 46 | 45 | 52 |
| Die C Tear | | | | | | |
| Tear Strength (kN/m) | 33 | 35 | 34 | 36 | 37 | 38 |
| Aged Tear Strength - 168 h @ 100° C. (kN/m) | 31 | 29 | 28 | 28 | 27 | 28 |
| Permeability | | | | | | |
| Permeability (cc mm/[m2 day]) | 319 | 329 | 326 | 319 | 319 | 322 |
| Demattia Flex Test | | | | | | |
| Crack Growth 300% (kc) - unaged | 31 | 38 | 67 | 83 | 155 | |
| Crack Growth 600% (kc) - unaged | 95 | 105 | 186 | 188 | 250 | |

Examples 79-84

Examples 79-84 were prepared according to the general formulation outlined in Table 25. Ingredients 1A were added to the mixer and at 90 sec 1B was added. Curatives (2A) were added on the mill. The samples were then cured and their physical and dynamic properties were evaluated as shown in Table 26. As evident from Table 26, partial replacement of the EPDM with Example 7 resulted in improved tack, hot tear and crack growth. Addition of ZnO (Examples 82-84) further improved tack and reduced increased heat rise noted in examples 80 and 81.

TABLE 25

| | | phr |
|---|---|---|
| Keltan 4450 | 1A | 100-80 |
| Example 7 | 1A | 0-20 |
| Sunpar 2280 | 1A | 15 |
| Struktol 40 | 1A | 2 |
| Carbon Black, N 330 | 1A | 70 |
| Vulkanox HS/LG | 1B | 1 |
| Zinc Oxide | 1B | 0-1 |
| Trimethylolpropane Trimethacrylate | 2A | 3 |
| Di-Cup 40C | 2A | 5 |
| HVA-2 | 2A | 1.0 |

TABLE 26

| | Example | | | | | |
|---|---|---|---|---|---|---|
| | 79 | 80 | 81 | 82 | 83 | 84 |
| Example 7 | 0 | 10 | 20 | 0 | 10 | 20 |
| Keltan 4450 | 100 | 90 | 80 | 100 | 90 | 80 |
| Zinc Oxide | 0 | 0 | 0 | 1 | 1 | 1 |
| Compound Mooney Viscosity (ML(1 + 4 + 4) @ 100° C.) | | | | | | |
| Mooney Viscosity (MU) | 97 | 108 | 111 | 100 | 109 | 112 |

TABLE 26-continued

|  | Example | | | | | |
|---|---|---|---|---|---|---|
|  | 79 | 80 | 81 | 82 | 83 | 84 |
| MDR Cure Characteristics (170° C.) | | | | | | |
| $M_H$ (dN · m) | 38 | 33 | 27 | 38 | 36 | 31 |
| $M_L$ (dN · m) | 4 | 5 | 5 | 4 | 5 | 5 |
| Delta $M_H - M_L$ (dN · m) | 34 | 28 | 23 | 38 | 32 | 26 |
| t' 90 (min) | 4 | 6 | 6 | 6 | 6 | 6 |
| Stress Strain (ambient temperature) | | | | | | |
| Hardness Shore A2 (pts.) | 71 | 69 | 69 | 70 | 71 | 71 |
| Ultimate Tensile | 19.4 | 17.4 | 15.6 | 19.3 | 17.8 | 15.9 |
| Ultimate Elongation (%) | 429 | 494 | 567 | 428 | 455 | 494 |
| Stress @ 100 (MPa) | 1.3 | 1.3 | 1.3 | 1.4 | 1.4 | 1.4 |
| Stress @ 200 (MPa) | 1.7 | 1.7 | 1.6 | 1.7 | 1.8 | 1.8 |
| Stress @ 300 (MPa) | 2.6 | 2.4 | 2.2 | 2.6 | 2.7 | 2.9 |
| Aged Stress Strain (168 h at 100° C.) | | | | | | |
| Hardness Shore A2 (pts.) | 70 | 71 | 71 | 71 | 72 | 72 |
| Ultimate Tensile (MPa) | 18.7 | 17.7 | 15.2 | 19.3 | 17.9 | 15.5 |
| Ultimate Elongation (%) | 430 | 482 | 508 | 438 | 453 | 476 |
| Stress @ 100 (MPa) | 1.6 | 1.5 | 1.5 | 1.5 | 1.5 | 1.5 |
| Stress @ 200 (MPa) | 1.9 | 1.9 | 1.9 | 1.8 | 2.0 | 2.0 |
| Stress @ 300 (MPa) | 2.9 | 2.7 | 2.7 | 2.7 | 2.8 | 2.9 |
| Permanent Set (ambient temperature) | | | | | | |
| Unaged Permanent Set (%) | 12 | 12 | 14 | 13 | 12 | 10 |
| Aged Perm. Set (168 h @ 100° C.; %) | 12 | 12 | 12 | 12 | 12 | 13 |
| Tel Tack (ambient temperature) | | | | | | |
| Tack to self | 38 | 36 | 41 | 46 | 45 | 52 |
| Die C Tear (ambient temperature) | | | | | | |
| Tear Strength (kN/m) | 40 | 41 | 41 | 38 | 39 | 42 |
| Aged Tear Strength - @ RT - 168 h @ 100° C. (kN/m) | 40 | 41 | 41 | 38 | 39 | 42 |
| Aged Tear Strength @ 100 C. - aged 168 h @ 100° C. (kN/m) | 22 | 41 | 40 | 21 | 41 | 40 |
| Demattia Flex Test (ambient temperature) | | | | | | |
| Crack Growth 300% (kc) - unaged | 4.3 | 8 | 29 | 4.1 | 3 | 6.7 |
| Crack Growth 600% (kc) - unaged | 38.7 | 37 | >250 | 16.7 | 12.3 | 51 |
| Crack Growth 300% (kc) - aged 100 C. for 168 h | 4 | 7 | 9.7 | 3.5 | 3.3 | 4.7 |
| Crack Growth 600% (kc) - aged 100 C. for 168 h | 18.1 | 25.5 | 114 | 15.3 | 12.9 | 23.3 |
| Doli Fexometer (ambient temperature) | | | | | | |
| Heat Rise (° C.) | 60 | 64 | 68 | 60 | 61 | 60 |
| Permanent Set (%) | 3.7 | 5.4 | 8.6 | 3.6 | 4.2 | 4.6 |

Examples 85-89

Examples 85-89 were prepared according to the general formulation outlined in Table 27. The elastomer(s) 1A were added to the mixer and at 60 sec 1B was added. Curatives (2A) were added on the mill. The samples were then cured and their physical and dynamic properties were evaluated as shown in Table 28. As evident from Table 28, partial replacement of the CIIR with Example 7 resulted in improved adhesion to carcass and flex fatigue resistance. Additionally, replacement of the NR with Example 7 resulted in a compound with improved impermeability, flex fatigue resistance and comparable adhesion.

TABLE 27

|  |  | phr |
|---|---|---|
| LANXESS Chlorobutyl 1240 | 1A | 100-60 |
| Example 7 | 1A | 0-20 |
| Natural Rubber | 1A | 0-40 |
| Stearic Acid | 1B | 1 |
| Resin SP1068 pellets | 1B | 4 |
| Rhenosin 145A | 1B | 7 |
| Sunpar 2280 | 1B | 7 |
| Carbon Black, N 660 | 1B | 60 |
| Sulfur | 2A | 0.5 |
| Vulkacit DM/C | 2A | 1.3 |
| Zinc Oxide | 2A | 3 |

TABLE 28

|  | Example | | | | |
|---|---|---|---|---|---|
|  | 85 | 86 | 87 | 88 | 89 |
| LANXESS Chlorobutyl 1240 | 100 | 80 | 60 | 90 | 80 |
| Example 7 | 0 | 0 | 0 | 10 | 20 |
| SMR CV60 Natural Rubber | 0 | 20 | 40 | 0 | 0 |
| Stress Strain (ambient temperature) | | | | | |
| Ultimate Tensile | 10.1 | 10.6 | 11.4 | 10.1 | 10.2 |
| Ultimate Elongation | 831 | 673 | 608 | 834 | 786 |

TABLE 28-continued

| | Example | | | | |
|---|---|---|---|---|---|
| | 85 | 86 | 87 | 88 | 89 |
| Stress @ 100 (MPa) | 1.4 | 1.6 | 1.7 | 1.5 | 1.7 |
| Stress @ 200 (MPa) | 3.0 | 3.2 | 3.4 | 2.9 | 3.3 |
| Stress @ 300 (MPa) | 4.6 | 4.8 | 5.3 | 4.3 | 4.9 |
| Die C Tear (ambient temperature) | | | | | |
| Tear Strength | 38 | 35 | 33 | 38 | 40 |
| Rubber Adhesion To Carcass (ambient temperature) | | | | | |
| Adhesive Strength | 8.7 | 6.9 | 13.6 | 15.3 | 16.8 |
| Tel Tak (ambient temperature) | | | | | |
| Tack to Carcass | 25 | 48 | 47 | 23 | 28 |
| Tack to Self | 63 | 53 | 49 | 49 | 61 |
| Permeability To Gases (ambient temperature) | | | | | |
| Permeability | 171 | 322 | 400 | 186 | 171 |
| Compound Mooney Viscosity (ML 1 + 8 @ 100° C.) | | | | | |
| Mooney Viscosity | 60 | 53 | 47 | 60 | 63 |
| Compound Mooney Scorch (ML @ 138° C.) | | | | | |
| t Value t05 (min) | 7 | 14 | 13 | 10 | 12 |
| t Value t35 (min) | 9 | 22 | 19 | 14 | 16 |
| DeMattia Flex Fatigue (aged 7 days @ 100° C., 2 mm punch) | | | | | |
| 300% Crack Growth | 100 | 50 | 50 | 100 | 150 |
| 600% Crack Growth | 210 | 150 | 200 | >250 | >250 |

Examples 90-91

Examples 90-91 were prepared according to the general formulation outlined in Table 29. The elastomer(s) 1A were added to the mixer and at 60 sec 1B was added. Curatives (2A) were added on the mill. The samples were then cured and their physical and dynamic properties were evaluated as shown in Table 30. As evident from Table 30, partial replacement of the BBX2 with Example 7 resulted in improved green strength and flex fatigue.

TABLE 29

| | | phr |
|---|---|---|
| LANXESS Bromobutyl X2 | 1A | 100-80 |
| Example 7 | 1A | 0-20 |
| Stearic Acid | 1B | 1 |
| Resin SP 1068 | 1B | 4 |
| Sunpar 2280 | 1B | 7 |
| Carbon Black, N 660 | 1B | 60 |
| Spider Sulfur | 2A | 0.5 |
| Vulkacit DM/C | 2A | 1.3 |
| Zinc Oxide | 2A | 3 |

TABLE 30

| | Example | |
|---|---|---|
| | 90 | 91 |
| LANXESS BROMOBUTYL X2 | 100 | 80 |
| Example 7 | 0 | 20 |
| Compound Mooney Viscosity (ML(1 + 4 + 4) @ 100° C.) | | |
| Mooney Viscosity (MU) | 68 | 70 |
| Compound Mooney Scorch (ML @ 125° C.) | | |
| t Value t35 (min) | 11 | 13 |
| t Value t05 (min) | 8 | 9 |

TABLE 30-continued

| | Example | |
|---|---|---|
| | 90 | 91 |
| MDR Cure Characteristics (160° C.) | | |
| $M_H$ (dN · m) | 11 | 11 |
| $M_L$ (dN · m) | 4 | 4 |
| Delta $M_H - M_L$ (dN · m) | 7 | 7 |
| t' 90 (min) | 8 | 12 |
| Green Strength | | |
| Peak Stress (MPa) | 0.33 | 0.78 |
| Stress Strain | | |
| Hardness Shore A2 (pts.) | 52 | 55 |
| Ultimate Tensile | 12.1 | 11.7 |
| Ultimate Elongation (%) | 642 | 706 |
| Stress @ 100 (MPa) | 1.5 | 1.8 |
| Stress @ 200 (MPa) | 3.8 | 4.2 |
| Stress @ 300 (MPa) | 6.6 | 6.5 |
| Aged Stress Strain (100° C. for 168 h) | | |
| Hardness Shore A2 (pts.) | 58 | 59 |
| Ultimate Tensile (MPa) | 11.1 | 11.0 |
| Ultimate Elongation (%) | 452 | 546 |
| Stress @ 100 (MPa) | 3.0 | 2.9 |
| Stress @ 200 (MPa) | 6.7 | 6.1 |
| Stress @ 300 (MPa) | 9.4 | 8.2 |
| Permeability | | |
| Permeability (cc mm/[m2 day]) | 187 | 179 |
| Demattia Flex Test (aged 168 h @ 100° C.) | | |
| Crack Growth Aged 300% (kc) | 30 | 52 |
| Crack Growth Aged 600% (kc) | 109 | 183 |

Examples 92-95

Examples 92-95 were prepared according to the general formulation outlined in Table 31. The elastomer(s) 1A were added to the mixer and at 60 sec 1B was added. Curatives (2A) were added on the mill. The samples were then cured and their physical and dynamic properties were evaluated as shown in Table 32. As evident from Table 32, partial replacement of the XIIR with Example 7 resulted in improved green strength, permeability, adhesion, and flex fatigue.

TABLE 31

| LANXESS Chlorobutyl 1240 | 1A | 0-80 |
|---|---|---|
| LANXESS Bromobutyl 2030 | 1A | 0-80 |
| Natural Rubber | 1A | 20 |
| Example 7 | 1A | 0 |
| Stearic Acid | 1B | 1 |
| Resin SP 1068 Pellets | 1B | 4 |
| Oil | 1B | 7 |
| Carbon Black, N 660 | 1B | 60 |
| Spider Sulfur | 2A | 0.5 |
| Vulkacit DM/C (MBTS) | 2A | 1.3 |
| Zinc Oxide | 2A | 3 |

TABLE 32

| | Example | | | |
|---|---|---|---|---|
| | 92 | 93 | 94 | 95 |
| LANXESS Chlorobutyl 1240 | 0 | 0 | 80 | 60 |
| LANXESS Bromobutyl 2030 | 80 | 60 | 0 | 0 |
| Example 7 | 0 | 20 | 0 | 20 |

TABLE 32-continued

| | Example | | | |
|---|---|---|---|---|
| | 92 | 93 | 94 | 95 |
| Compound Mooney Viscosity (ML(1 + 4 + 4) @ 100° C.) | | | | |
| Mooney Viscosity (MU) | 54 | 54 | 57 | 58 |
| Compound Mooney Scorch (ML @ 125° C.) | | | | |
| t Value t35 (min) | 9 | 9 | 17 | 13 |
| t Value t05 (min) | 16 | 15 | >30 | 19 |
| MDR Cure Characteristics (160° C.) | | | | |
| $M_H$ (dN · m) | 13 | 11 | 14 | 12 |
| $M_L$ (dN · m) | 3 | 3 | 3 | 3 |
| Delta $M_H - M_L$ (dN · m) | 11 | 9 | 11 | 9 |
| t' 90 (min) | 8 | 8 | 9 | 10 |
| Green Strength | | | | |
| Peak Stress (MPa) | 0.25 | 0.35 | 0.27 | 0.37 |
| Stress Strain | | | | |
| Hardness Shore A2 (pts.) | 56 | 56 | 57 | 56 |
| Ultimate Tensile | 12.4 | 11.4 | 12.3 | 11.3 |
| Ultimate Elongation (%) | 558 | 636 | 499 | 614 |
| Stress @ 100 (MPa) | 1.9 | 1.9 | 2.4 | 1.9 |
| Stress @ 200 (MPa) | 4.5 | 2.0 | 5.3 | 4.2 |
| Stress @ 300 (MPa) | 7.4 | 6.1 | 8.3 | 6.5 |
| Aged Stress Strain (100° C. for 168 h) | | | | |
| Hardness Shore A2 (pts.) | 63 | 62 | 66 | 62 |
| Ultimate Tensile (MPa) | 10.6 | 9.5 | 11.0 | 10.1 |
| Ultimate Elongation (%) | 350 | 433 | 328 | 396 |
| Stress @ 100 (MPa) | 3.7 | 3.0 | 3.7 | 3.2 |
| Stress @ 200 (MPa) | 6.8 | 5.8 | 7.2 | 6.5 |
| Stress @ 300 (MPa) | 9.6 | 7.8 | 10.4 | 8.9 |
| Permeability | | | | |
| Permeability (cc mm/[m2 day]) | 344 | 315 | 352 | 300 |
| Demattia Flex Test (aged 168 h @ 100° C.) | | | | |
| Crack Growth Aged 300% (kc) | 62 | 72 | 10 | 63 |
| Crack Growth Aged 600% (kc) | >250 | >250 | 51 | 173 |
| Adhesion to Carcass | | | | |
| Adhesion at Ambient Temperature (kNm) | 9 | 11 | 6 | 7 |
| Adhesion at 100° C. (kNm) | 3 | 5 | 2 | 2 |
| Die C Tear | | | | |
| Unaged Tear Strength (kN/m) | 34 | 41 | 33 | 37 |
| Aged Tear Strength (100° C. for 168 h; kNm) | 29 | 34 | 27 | 30 |
| Doli Flexometer | | | | |
| Permanent Set (%) | 6 | 7 | 4 | 5 |
| Heat Bulid-up (° C.) | 42 | 44 | 39 | 40 |
| Mill Shrinkage | | | | |
| Shrinkage @ 50° C. (%) | 23 | 26 | 26 | 26 |
| Shrinkage @ 90° C. (%) | 11 | 13 | 15 | 12 |

TABLE 33

| | | phr |
|---|---|---|
| LANXESS Butyl 301 | 1A | 89-69 |
| Example 7 | 1A | 0-20 |
| LANXESS Bayprene 210 | 1A | 5 |
| Stearic Acid | 1B | 1 |
| Carbon Black, N 330 | 1B | 10 |
| Acetylene Carbon Black | 1C | 40 |
| Castor Oil | 1D | 5 |
| Rhein Chemie WBC-41P | 2A | 21.4 |

TABLE 34

| | Example | | | | |
|---|---|---|---|---|---|
| | 96 | 97 | 98 | 99 | 100 |
| LANXESS BUTYL 301 | 89 | 84 | 79 | 74 | 69 |
| Example 7 | 0 | 5 | 10 | 15 | 20 |
| Compound Mooney Viscosity (ML(1 + 4 + 4) @ 100° C.) | | | | | |
| Mooney Viscosity (MU) | 76 | 83 | 86 | 82 | 86 |
| MDR Cure Characteristics (160° C.) | | | | | |
| $M_H$ (dN · m) | 17 | 16 | 16 | 14 | 14 |
| $M_L$ (dN · m) | 3 | 4 | 4 | 4 | 4 |
| Delta $M_H - M_L$ (dN · m) | 14 | 12 | 12 | 10 | 10 |
| t' 90 (min) | 13 | 14 | 17 | 17 | 18 |
| Stress Strain | | | | | |
| Hardness Shore A2 (pts.) | 58 | 60 | 62 | 62 | 62 |
| Ultimate Tensile | 12.9 | 12.1 | 12.4 | 11.9 | 12.1 |
| Ultimate Elongation (%) | 669 | 679 | 668 | 693 | 697 |
| Stress @ 100 (MPa) | 1.7 | 2.0 | 2.0 | 1.9 | 2.0 |
| Stress @ 200 (MPa) | 3.44 | 3.74 | 3.92 | 3.49 | 3.8 |
| Stress @ 300 (MPa) | 5.54 | 5.68 | 5.94 | 5.2 | 5.61 |
| Aged Stress Strain (180° C. for 24 h) | | | | | |
| Hardness Shore A2 (pts.) | 78 | 82 | 79 | 76 | 79 |
| Ultimate Tensile (MPa) | 10.0 | 9.6 | 10.0 | 8.1 | 8.9 |
| Ultimate Elongation (%) | 290 | 309 | 325 | 292 | 299 |
| Stress @ 100 (MPa) | 4.2 | 4.3 | 4.3 | 4.2 | 4.4 |
| Stress @ 200 (MPa) | 7.4 | 7.3 | 7.2 | 6.6 | 7.1 |
| Stress @ 300 (MPa) | n/a | 9.5 | 9.4 | n/a | n/a |
| Demattia Flex Test (aged 168 h @ 100° C.) | | | | | |
| Crack Growth Aged 300% (kc) | 0.3 | 0.5 | 0.5 | 1 | 1.5 |
| Crack Growth Aged 600% (kc) | 1.0 | 1.75 | 2.0 | 7.0 | 8.0 |
| Die C Tear | | | | | |
| Unaged Tear Strength (kN/m) | 35 | 36 | 35 | 36 | 36 |
| Aged Tear Strength (180° C. for 24 h; kNm) | 28 | 29 | 30 | 30 | 29 |

Examples 96-100

Examples 96-100 were prepared according to the general formulation outlined in Table 33. The elastomer(s) 1A were added to the mixer, at 30 sec 1B was added, at 75 sec 1C was added and at 120 sec 1D was added. Curatives (2A) were added on the mill. The samples were then cured and their physical and dynamic properties were evaluated as shown in Table 34. As evident from Table 34, partial replacement of the regular butyl with Example 7 resulted in improved flex fatigue.

Examples 101-103

Examples 101-103 were prepared according to the general formulation outlined in Table 35. The elastomer(s) 1A were added to the mixer, at 60 sec 1B was added, and at 240 sec 1C was added. Curatives (2A) were added on the mill. The samples were then cured and their physical and dynamic properties were evaluated as shown in Table 36. As evident from Table 36, partial replacement of the bromobutyl with Example 7 resulted in improved flex fatigue, higher tack, higher green strength and improved impermeability.

TABLE 35

|  |  | phr |
|---|---|---|
| LANXESS X_Butyl BB2030 | 1A | 60-80 |
| SMR CV60 Natural Rubber | 1A | 20 |
| Example 7 | 1A | 0-20 |
| Stearic Acid | 1B | 1 |
| Resin SP 1068 | 1B | 4 |
| Polyfil DL | 1B | 30 |
| Sunpar 2280 | 1B | 7 |
| Carbon Black N660 | 1B | 45 |
| Spider Sulphur | 2A | 0.5 |
| Vulkacit DM/C (MBTS) | 2A | 1.3 |
| Zinc Oxide | 2A | 3 |

TABLE 36

|  | Example | | |
|---|---|---|---|
|  | 101 | 102 | 103 |
| LANXESS BB2030 | 80 | 70 | 60 |
| Example 7 | 0 | 10 | 20 |
| Mooney | | | |
| Mooney Scorch (125° C.) | 8 | 9 | 9 |
| Mooney Viscosity (ML 1 + 4 @ 100° C.) | 48 | 48 | 51 |
| MDR Cure Characteristics (160° C.) | | | |
| $M_H$ (dN · m) | 11 | 10 | 9 |
| $M_L$ (dN · m) | 2 | 2 | 3 |
| Delta $M_H - M_L$ (dN · m) | 9 | 8 | 7 |
| t' 90 (min) | 9 | 9 | 8 |
| Green Strength | | | |
| Peak Stress (MPa) | 0.25 | 0.35 | 0.38 |
| Stress Strain | | | |
| Hardness Shore A2 (pts.) | 54 | 55 | 56 |
| Ultimate Tensile | 12.0 | 12.0 | 11.7 |
| Ultimate Elongation (%) | 847 | 689 | 676 |
| Stress @ 100 (MPa) | 1.7 | 1.8 | 2.0 |
| Stress @ 300 (MPa) | 5.3 | 4.9 | 5.1 |
| Aged Stress Strain (100° C. for 168 h) | | | |
| Hardness Shore A2 (pts.) | 61 | 82 | 81 |
| Ultimate Tensile (MPa) | 9.5 | 9.2 | 9.1 |
| Ultimate Elongation (%) | 479 | 548 | 554 |
| Stress @ 100 (MPa) | 2.8 | 3.0 | 2.9 |
| Stress @ 300 (MPa) | 6.4 | 6.3 | 6.1 |
| Demattia Flex Test (aged 168 h @ 100° C.) | | | |
| 300% Crack Growth (kc) | 70 | 80 | 200 |
| Permeability | | | |
| (cc mm/[m² day]) | 274 | 248 | 235 |
| Die C tear | | | |
| Unaged Tear Strength (kN/m) | 31 | 33 | 34 |
| Aged Tear Strength (100° C. for 168 h; kNm) | 29 | 31 | 33 |
| Tack | | | |
| Self (psi) | 41 | 51 | 80 |
| Carcass (psi) | 36 | 38 | 40 |
| Adhesion | | | |
| Carcass (kNm) | 14 | 15 | 15 |
| Mill Shrinkage | | | |
| 50 C. after 2 h (%) | 23 | 22 | 21 |
| 50 C. after 24 h (%) | 25 | 27 | 27 |
| 90 C. after 2 h (%) | 14 | 13 | 11 |
| 90 C. after 24 h (%) | 17 | 17 | 14 |

Examples 104-106

Examples 104-106 were prepared according to the general formulation outlined in Table 37. The elastomer(s) 1A were added to the mixer, at 60 sec 1B was added, and at 240 sec 1C was added. Curatives (2A) were added on the mill. The samples were then cured and their physical and dynamic properties were evaluated as shown in Table 38. As evident from Table 38, partial replacement of the chlorobutyl with Example 7 resulted in improved flex fatigue, higher green strength and improved impermeability.

TABLE 37

|  |  | phr |
|---|---|---|
| LANXESS X_Butyl CB1240 | 1A | 60-80 |
| SMR CV60 Natural Rubber | 1A | 20 |
| Example 7 | 1A | 0-20 |
| Stearic Acid | 1B | 1 |
| Resin SP 1068 | 1B | 4 |
| Calcium Carbonate | 1B | 40 |
| Sunpar 2280 | 1B | 7 |
| Carbon Black N660 | 1B | 60 |
| Spider Sulphur | 2A | 0.5 |
| Vulkacit DM/C (MBTS) | 2A | 1.3 |
| Zinc Oxide | 2A | 3 |

TABLE 38

|  | Example | | |
|---|---|---|---|
|  | 104 | 105 | 106 |
| LANXESS CB1240 | 80 | 70 | 80 |
| Example 7 | 0 | 10 | 20 |
| Mooney | | | |
| Mooney Scorch (125° C.) | 18 | 14 | 13 |
| Mooney Viscosity (ML 1 + 4 @ 100° C.) | 54 | 55 | 56 |
| MDR Cure Characteristics (160° C.) | | | |
| $M_H$ (dN · m) | 14 | 13 | 12 |
| $M_L$ (dN · m) | 2 | 3 | 3 |
| Delta $M_H - M_L$ (dN · m) | 23 | 10 | 9 |
| t' 90 (min) | 14 | 13 | 13 |
| Green Strength | | | |
| Peak Stress (MPa) | 0.26 | 0.36 | 0.42 |
| Stress Strain | | | |
| Hardness Shore A2 (pts.) | 55 | 55 | 56 |
| Ultimate Tensile | 10.2 | 10.4 | 9.7 |
| Ultimate Elongation (%) | 503 | 566 | 636 |
| Stress @ 100 (MPa) | 1.8 | 1.6 | 1.5 |
| Stress @ 300 (MPa) | 5.9 | 5.2 | 4.6 |
| Aged Stress Strain (100° C. for 168 h) | | | |
| Hardness Shore A2 (pts.) | 65 | 61 | 61 |
| Ultimate Tensile (MPa) | 9.2 | 8.8 | 8.8 |
| Ultimate Elongation (%) | 358 | 400 | 435 |
| Stress @ 100 (MPa) | 2.9 | 2.6 | 2.5 |
| Stress @ 300 (MPa) | 8.0 | 7.1 | 6.6 |
| Demattia Flex Test (aged 168 h @ 100° C.) | | | |
| 300% Crack Growth (kcycles) | 3 | 5 | 10 |
| 600% Crack Growth (kcycles) | 12 | 22 | 41 |
| Permeability | | | |
| (cc mm/[m² day]) | 325 | 292 | 286 |
| Die C tear | | | |
| Unaged Tear Strength (kN/m) | 29 | 29 | 35 |
| Aged Tear Strength (100° C. for 168 h; kNm) | 25 | 25 | 26 |

TABLE 38-continued

| | Example | | |
|---|---|---|---|
| | 104 | 105 | 106 |
| Mill Shrinkage | | | |
| 90 C. after 2 h (%) | 11 | 10 | 10 |
| 90 C. after 24 h (%) | 12 | 13 | 13 |

Examples 107-109

Examples 107-109 were prepared according to the general formulation outlined in Table 38. The elastomer(s) 1A were added to the mixer, at 60 sec 1B was added, and at 240 sec 1C was added. Curatives (2A) were added on the mill. The samples were then cured and their physical and dynamic properties were evaluated as shown in Table 40. As evident from Table 40, partial replacement of the chlorobutyl with Example 7 resulted in improved flex fatigue and higher green strength.

TABLE 39

| | | phr |
|---|---|---|
| X_Butyl™ CB 1240 | 1A | 50-70 |
| SMR CV60 Natural Rubber | 1A | 30 |
| Example 7 | 1A | 0-20 |
| Carbon Black N774 | 1B | 70 |
| Stearic Acid | 1B | 2 |
| Vulkanox HS/LG | 1B | 1.5 |
| Zinc Oxide | 1B | 5 |
| Escorez 1102 | 1B | 10 |
| Sunpar 2280 | 1B | 5 |
| Vulkacit Merkapto MG/C (MBT) | 2A | 0.2 |
| Vulkacit DM/C (MBTS) | 2A | 1 |
| Sulphur | 2A | 1.5 |
| Vultac TB710 | 2A | 1 |

TABLE 38

| | Example | | |
|---|---|---|---|
| | 107 | 108 | 109 |
| LANXESS CB1240 | 70 | 60 | 30 |
| Example 7 | 0 | 10 | 20 |
| Mooney | | | |
| Mooney Viscosity (ML 1 + 4 @ 100° C.) | 44 | 43 | 42 |
| MDR Cure Characteristics (180° C.) | | | |
| $M_H$ (dN · m) | 11 | 9 | 8 |
| $M_L$ (dN · m) | 1 | 1 | 1 |
| Delta $M_H - M_L$ (dN · m) | 10 | 8 | 7 |
| t' 90 (min) | 3 | 2 | 2 |
| Green Strength | | | |
| Peak Stress (MPa) | 0.21 | 0.30 | 0.47 |
| Stress Strain | | | |
| Hardness Shore A2 (pts.) | 61 | 58 | 57 |
| Ultimate Tensile | 10.4 | 11.5 | 11.2 |
| Ultimate Elongation (%) | 291 | 519 | 566 |
| Stress @ 100 (MPa) | 3.1 | 2.3 | 2.3 |
| Stress @ 300 (MPa) | n/a | 7.7 | 6.5 |
| Aged Stress Strain (100° C. for 168 h) | | | |
| Hardness Shore A2 (pts.) | 65 | 61 | 59 |
| Ultimate Tensile (MPa) | 10.5 | 10.2 | 10.2 |
| Ultimate Elongation (%) | 200 | 293 | 337 |
| Stress @ 100 (MPa) | 5.8 | 4.2 | 3.5 |
| Stress @ 300 (MPa) | n/a | n/a | 9.4 |
| Demattia Flex Test (aged 168 h @ 100° C.) | | | |
| 300% Crack Growth (kcycles) | 0.5 | 1 | 3 |
| 600% Crack Growth (kcycles) | 0.8 | 4 | 12 |
| Die C tear | | | |
| Unaged Tear Strength (kN/m) | 27 | 30 | 32 |
| Aged Tear Strength (100° C. for 168 h; kNm) | 22 | 223 | 26 |
| Mill Shrinkage | | | |
| 90 C. after 2 h (%) | | | |
| 90 C. after 24 h (%) | | | |

Examples 110-113

Examples 110-113 were prepared according to the general formulation outlined in Table 40. 1A were added to the mixer, followed by 1B and then 1C. Curatives (2A) were added on the mill. The samples were then cured and their physical and dynamic properties were evaluated as shown in Table 41. As evident from Table 41, partial replacement of the EPDM with Example 7 resulted in improved flex fatigue.

TABLE 40

| | | phr |
|---|---|---|
| Sunpar 2280 | 1A | 150 |
| Carbon Black N550 | 1A | 220 |
| Keltan 4450 | 1B | 80-100 |
| X_Butyl™ I4565P | 1B | 0-20 |
| Carbowax 3350 | 1C | 2 |
| Stearic Acid | 1C | 2 |
| Calcium Carbonate | 1C | 50-80 |
| ZOCO 104 | 2A | 5 |
| Perkacit TBzTD | 2A | 4 |
| Sulphur | 2A | 1.5 |
| Vulkacit Merkapto MG/C (MBT) | 2A | 3 |

TABLE 41

| | Example | | | |
|---|---|---|---|---|
| | 110 | 111 | 112 | 113 |
| Keltan 4450 | 100 | 80 | 100 | 80 |
| Example 7 | 0 | 20 | 0 | 20 |
| Calcium Carbonate | 50 | 50 | 80 | 80 |
| Mooney | | | | |
| Mooney Scorch (138 C.) | 5 | 4 | 4 | 5 |
| Mooney Viscosity (ML 1 + 4 @ 100° C.) | 56 | 56 | 66 | 57 |
| MDR Cure Characteristics (160° C.) | | | | |
| $M_H$ (dN · m) | 14 | 14 | 17 | 14 |
| $M_L$ (dN · m) | 2 | 2 | 2 | 2 |
| Delta $M_H - M_L$ (dN · m) | 12 | 12 | 15 | 12 |
| t' 90 (min) | 13 | 15 | 16 | 15 |
| Stress Strain | | | | |
| Ultimate Tensile | 7.8 | 5.4 | 6.6 | 5.4 |
| Ultimate Elongation (%) | 296 | 300 | 291 | 343 |
| Stress @ 100 (MPa) | 3.4 | 2.5 | 3.4 | 2.5 |

TABLE 41-continued

| | Example | | | |
|---|---|---|---|---|
| | 110 | 111 | 112 | 113 |
| Demattia Flex Test (unaged) | | | | |
| 300% Crack Growth (kcycles) | 0.6 | 1 | 0.1 | 0.8 |
| 600% Crack Growth (kcycles) | 3.7 | 4 | 1.7 | 4.4 |

All documents cited herein are incorporated herein by reference.

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. An elastomeric compound comprising a cured blend of:
    a butyl rubber ionomer,
    a non-butyl rubber elastomer co-curable with the butyl rubber ionomer, and
    a filler.
2. The elastomeric compound according to claim 1, wherein the co-curable non-butyl rubber elastomer comprises one or more units of unsaturation.
3. The elastomeric compound according to claim 1, wherein the co-curable non-butyl rubber elastomer comprises, isobutylene-methylstyrene copolymer, ethylene propylene rubber, ethylene propylene diene monomer rubber, butadiene rubber, solution styrene butadiene rubber, emulsion styrene butadiene rubber, acrylonitrile butadiene rubber, hydrogenated acrylonitrile butadiene rubber, natural rubber, epoxidized natural rubber, polyurethane, polyisoprene rubber, polyacrylic, polyacrylate, chloroprene, chlorosulphonylpolyethlene, chlorosulphonatedpolyethylene, ethylene acrylic, thermoplastic polyester urethane, thermoplastic polyether urethane, epichlorohydrin, fluoroethylene propylene-perfluoroalkoxy, tetrafluoroethylene/propylene, perfluoroelastomer, fluoroelastomer or fluorocarbon, fluorosilicone, silicone, polytetrafluoroethylene, ethylene vinylacetate rubber, ethylene acrylate rubber, polyurethane rubber, polyisobutylene, chlorinated polyethylene, polynorbornene rubber, polysulphide rubber or mixtures thereof.
4. The elastomeric compound according to claim 1, further comprising at least one additional co-curable elastomer.
5. The elastomeric compound according to claim 1, wherein the butyl rubber ionomer is present in an amount of 1-50 phr.
6. The elastomeric compound according to claim 1, wherein the butyl rubber ionomer comprises phosphorus-based or nitrogen-based ionic moieties.
7. The elastomeric compound according to claim 1, wherein:
    the filler is present in an amount of 1-100 phr, and
    the filler comprises carbon black, mineral filler or mixtures thereof.
8. The elastomeric compound according to claim 7, wherein the filler comprises mineral filler and the mineral filler comprises silica or a high aspect ratio filler.
9. The elastomeric compound according to claim 1, wherein the compound with the butyl rubber ionomer has a crack growth resistance as measured by ASTM D 813 over 1.2 times greater than crack growth resistance of a cured blend comprising the co-curable elastomer and the filler but not the butyl rubber ionomer.
10. The elastomeric compound according to claim 1, wherein the compound with the butyl rubber ionomer has a damping as measured by tan d @70 Hz at least 1.1 times greater than damping of a cured blend comprising the co-curable elastomer and the filler but not the butyl rubber ionomer.
11. The elastomeric compound according to claim 1, wherein the compound with the butyl rubber ionomer has a traction at least 1.1 times greater than traction of a cured blend comprising the co-curable elastomer and the filler but not the butyl rubber ionomer.
12. A process for producing an elastomeric compound, the process comprising:
    blending a butyl rubber ionomer, a non-butyl rubber elastomer co-curable with the butyl rubber ionomer, and a filler to produce a blend; and curing the blend.
13. The process according to claim 12, wherein the curing further comprises curing the blend with a sulfur-based cure system, a peroxide-based cure system, or a resin-based cure system at a curing temperature of about 80° C to about 250° C.
14. The process according to claim 12, wherein the butyl rubber ionomer is blended in an amount of less than 50 phr.
15. The process according to claim 12, wherein the butyl rubber ionomer comprises phosphorus-based or nitrogen-based ionic moieties.
16. The process according to claim 12, wherein the filler comprises carbon black, mineral filler, or mixtures thereof.
17. An article of manufacture comprising an elastomeric compound as defined in claim 1.
18. The article of manufacture according to claim 17, wherein the article of manufacture is a belt, a hose, a shoe sole, a gasket, an o-ring, a wire, a cable, an inner tube, a membrane, a roller, a bladder, an inner liner of a tire, a tire tread, a shock absorber, a machinery mounting, a balloon, a ball, a golf bail, protective clothing, medical tubing, a storage tank lining, electrical insulation, a bearing, a pharmaceutical stopper, an adhesive, a sealant, a container, a container closure or lid, a seal, a material handing apparatus, a cooling tower, a metal working apparatus, an apparatus in contact with metal working fluids, or an engine component.
19. The elastomeric compound according to claim 1, wherein:
    the butyl rubber ionomer comprises phosphorus-based or nitrogen-based ionic moieties, and is present in the compound an amount of 1-50 phr;
    the co-curable non-butyl rubber elastomer comprises one or more units of unsaturation; and
    the filler comprises carbon black, mineral filler or mixtures thereof, and is present in an amount of 1-100 phr.
20. The elastomeric compound according to claim 1, wherein:
    the butyl rubber ionomer comprises phosphorus-based or nitrogen-based ionic moieties, and is present in the compound an amount of about 15-30 phi;
    the at least one co-curable non-butyl rubber elastomer is selected from the group consisting of isobutylene-methylstyrene copolymer, ethylene propylene rubber, ethylene propylene diene monomer rubber, butadiene rubber, solution styrene butadiene rubber, emulsion styrene butadiene rubber, acrylonitrile butadiene rubber, hydrogenated acrylonitrile butadiene rubber, natural rubber, epoxidized natural rubber, polyurethane, polyisoprene rubber, polyacrylic, polyacrylate, chloroprene, chlorosulphonylpolyethylene, chlorosulphonatedpolyethylene, ethylene acrylic, thermoplastic polyester urethane, thermoplastic polyether urethane, epichlorohydrin, fluoroethylene propylene-perfluoroalkm, tetrafluoroethylene/propylene, perfluoroelastomer, fluoroelastomer or fluorocarbon, fluorosilicone, smlmcone, polytetrafluoroethylene, ethylene vinylacetate rubber, ethylene acrylate rubber, polyurethane rubber, polyisobutylene, chlorinated polyethylene, polynorbornene rubber, polysulphide rubber, and mixtures thereof;

the elastomeric compound further comprises at least one additional co-curable elastomer;

the filler is present in an amount of about 5-15 phr, and the filler comprises mineral filler having an aspect ratio (length:diameter) of 1:3;

the elastomeric compound with the butyl rubber ionomer has:

a crack growth resistance as measured by ASTM D 813 over 4 times greater than crack growth resistance of a cured elastomeric compound comprising the co-curable non-butyl rubber elastomer and the filler but not the butyl rubber ionomer;

an adhesion over 1.5 times greater than the adhesion of a cured elastorrteric compound comprising the co-curable non-butyl rubber elastomer and the filler but not the butyl rubber ionomer;

a tear strength as measured by Die C Tear (ASTM D 624) at 23° C over 2 times greater than the tear strength of cured elastorneric compound comprising the co-curable non-butyl rubber elastomer and the filler but not the butyl rubber ionomer;

a damping as measured by tan d @70 Hz at least 1.1 times greater than damping of a cured elastomeric compound comprising the co-curable non-butyl rubber elastomer and the filler but not the butyl rubber ionomer; and a traction at least 1.1 times greater than traction of a cured elastomeric compound comprising the co-curable non-butyl rubber elastomer and the filler but not the butyl rubber ionomer.

* * * * *